June 22, 1971 D. RUBENSTEIN Re. 27,144

MANUFACTURE OF REINFORCED COMPOSITE CONCRETE PIPE-LINE CONSTRUCTIONS

Original Filed Oct. 24, 1965 7 Sheets-Sheet 1

INVENTOR.

David Rubenstein

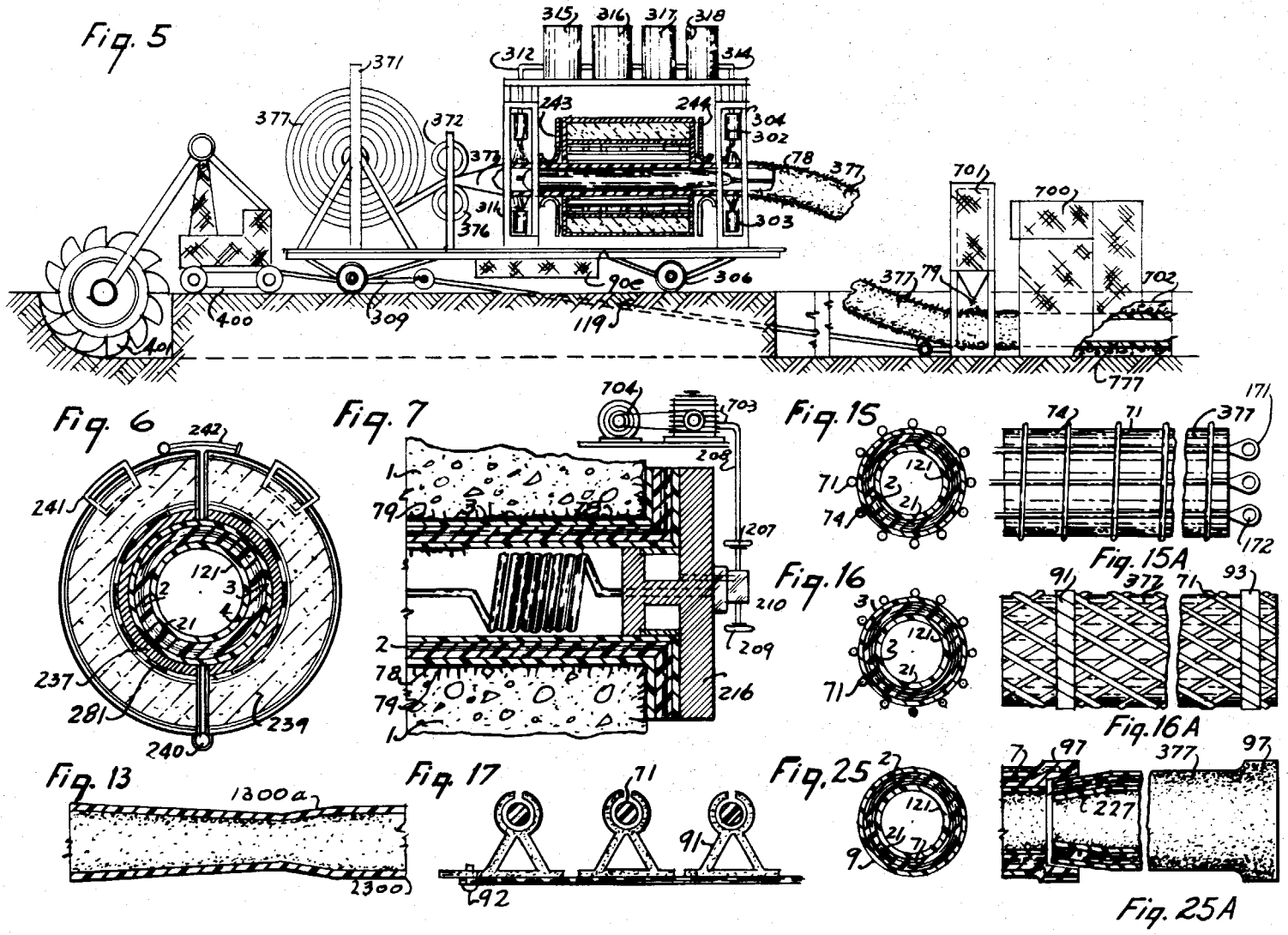
INVENTOR
DAVID RUBENSTEIN

INVENTOR.
David Rubenstein

INVENTOR.
David Rubenstein

INVENTOR
DAVID RUBENSTEIN

INVENTOR.

David Rubenstein

INVENTOR.
David Rubenstein

United States Patent Office

Re. 27,144
Reissued June 22, 1971

27,144

MANUFACTURE OF REINFORCED COMPOSITE CONCRETE PIPE-LINE CONSTRUCTIONS

David Rubenstein, San Diego, Calif., assignor to Chemstress Industries, Inc.

Original No. 3,380,259, dated Apr. 30, 1968, Ser. No. 522,336, Oct. 24, 1965, which is a continuation-in-part of Ser. No. 392,075, Aug. 19, 1964, and Ser. No. 391,987, Aug. 25, 1964. Application for reissue Apr. 28, 1969, Ser. No. 824,011

Int. Cl. F16l *1/00;* B31c *11/04*

U.S. Cl. 61—72.2 34 Claims

Matter enclosed in heavy brackets [ ] appears in the original patent but forms no part of this reissue specification; matter printed in italics indicates the additions made by reissue.

ABSTRACT OF THE DISCLOSURE

This patent application relates to methods and apparatus for the manufacture of polymeric-resin composition - fiber reinforced - cast - in- place- porous - structural - material - concrete - pipe - lines. Pipe - liners are provided on-site by make-up and processing apparatus and placed in a ditch dug by a self-propelled ditcher which hauls said apparatus on a trailer-processing rig which provides said pipe-liner. The said pipe-liner acts first as a forming means for casting a concrete cover component of the pipe-line and remains in place as a polymerized-polymeric - resin - composition - fiber - reinforced - pipe-liner. A concrete placing machine is hauled over the pipe-liner in the trench and concrete or other porous structural material placed around, about, over and under the pipe-liner, thus making a reinforced concrete pipe-line having corrosion resistant features.

This patent application is a continuation-in-part of my copending prior patent application Serial No. 391,987, filed Aug. 25, 1964, now Patent 3,250,654 and my copending prior patent application Serial No. 392,075, filed Aug. 19, 1964, now abandoned. The latter application is a continuation-in-part application to my prior patent applications Serial No. 743,464, filed June 20, 1958, a portion of which is now U.S. Patent No. 3,111,569; Serial No. 702,-050, filed Dec. 11, 1957; a portion of which is now U.S. Patent No. 3,177,902; both filed as continuations-in-part applications to my patent application Serial No. 345,084, filed March 27, 1953, whose specification now is abandoned but whose inventions disclosed therein are not abandoned; and which applications are continuations-in-part to my prior patent application Serial No. 229,852, filed June 4, 1951, a portion of which is now U.S. Patent No. 2,850,890.

This patent application relates to improvements in the manufacture of reinforced composite concrete pipe, and in particular, discloses and claims novel and useful features, product, methods of making and apparatus useful in making this pipe. This invention is particularly useful in the manufacture of large sized service lines comprising water systems, irrigation systems, sewer systems, or the like, and includes special constructions useful in oil, gas, and chemical pipe systems.

Further, this invention provides features of novel invention which are used in on-site manufacture of reinforced composite concrete pipe or vessels in conjunction with prior art on site concrete pipe laying machines as exampled in U.S. Patents Nos. 2,969,576; 2,731,698; 3,032,852; 3,049,787; and 3,106,760, but not limited thereto.

An object is to utilize this invention to substantially reduce the cost of irrigation systems, water systems, and other engineered pipe-line systems.

Another object of this invention is to make high pressure prestressed preloaded reinforced concrete engineered constructions, prestressed concrete pipe, and prestressed concrete pile constructions.

Another object of this invention is to make high pressure composite concrete pipe lines wherein the reinforcing means comprises non-metallic reinforcing means used alone, and/or non-metallic means comprising reinforcing used in combination with selected metallic reinforcing, said reinforcing means being used in on-site constructions and being combined with poured-in-place concrete material or other selected poured-in-place porous structural material.

Another object of this invention is to make low or no-pressure composite concrete pipe lines having pipe-liner construction which provides a very smooth interior surface to the construction which surface improves flowability through such a pipe-line on the order of 25% increased flow, more or less.

By definition herein, the word "concrete" is broadly defined as such material being "[porous] structural material" and includes any "[porous] structural material" capable of and of being used in various embodiments of this invention. The [porous] structural material utilized in this invention can be made out of any masonry or concrete material in the form of a member of the group consisting of *at least one aggregate particle filler,* Portland cement concrete, lightweight Portland cement concrete, perlite-concrete material, fire-expanded shale aggregate concrete material, fire-expanded clay aggregate concrete material, volcanic cinder concrete aggregate material, processed cinder aggregate concrete material, river run crushed rock aggregate material, pit-excavated crushed rock aggregate material, silica sand, washed aggregate sands, and in fact any natural stone or man-made stone-like products having the required engineering materials strengths in any specific structural design of the invention can be used. Each raw concrete material in terms of the broad definition herein is used in a balanced designed structural engineering manner adapted to its own particular features in use. *Structural material* [Concrete] utilizing polymerizable polymeric resin compositions as the bonding material may be used wherein all Portland cement is emitted from the mixture, and/or portions of the Portland cement being provided mixed with non-cementitious cements, as e.g., polymerizable polymeric resinous thermoplastis and/or thermosetting materials. Compatible combination of thermoplastic and thermosetting materials may be used for their structural properties and for co-reactive properties in specific formulations as binders in providing concrete pipe line material components of the invention.

The *continuous* composite [structure] *structural material* pipe*line* construction comprises the sandwiching, and laminating as well as the chemical and mechanical dispersion of cements, aggregates and materials to integrate and laminate and compose into structure the various materials used. By using materials having structural, chemical, resistance, and other characteristics having specific functions in specific type embodiments of this invention uses normal to the said materials or modified uses of the said materials, provide useful embodiments of this invention. By methods utilizing casting, membering, joining, assembling and incorporation by lamination, component parts, pieces, units, fabrics, binders, fillers, fiber glass rovings, fiber glass strands, glass fiber woven roving, unidirectional glass fiber roving mats, glass fiber mats, glass fiber cloth, extenders, natural fibers, synthetic fibers, sisal fibers, steel wire, either woven or plain, deformed or smooth reinforcements, copper wire, metal reinforcements of any type, wire cables, rods, perforated metal, hemp, rope, nylon, rubber, butyl rubber, plastics, plasters, wood fibers, wood pieces, bamboo, burlap, asbestos filler, asbestos fibers, crushed rocks, silca particles, sand, minerals. Portland cements, natural cements, and any other materials whose final end use properties, and functional characteristics add to, comprise, make, constitute, cast, laminate or incorporate added strength in tension, compression, shear and torsion, provide new and novel composite improvements. In particular, materials useful in resistance to abrasion, e.g., minerals of the order of 4 to 10 on Moh's scale are useful materials. Clay in several of its chemical compositions, e.g., *bentonite* [betonite] clays are useful materials. Lead in sheet, strip, particles and powder form comprises a useful material in certain specific embodiments of this invention.

The constructions of this invention are directed to "Water-Saving" features in the construction of irrigation pipe-line systems, potable water supply systems, and the like. Quantities of water are lost in the present water supply systems because of leakage because of cracks in the body of the pipe or because of permeation through the walls of the said pipe, e.g., as much as thirty percent (30%) of transported water is lost in transmission.

The manufacture of unreinforced concrete pipe lines in the existing art has inherent problems due to the nature of conventional concrete because of the shrinkage of concrete in its setting, its low tensile strength, generally less than its compression strength, being about 10% or less of its compression strength. Shrinkage causes cracks and cracks cause leaks and loss of water or other fluids flowing through such pipe. Additionally, earth loads, expansion pressures of soils having expansive characteristics, like adobe soils, poor supporting sub-grades, "slugging," i.e., admitting large quantities of water to a pipe line so as to cause high internal pressures by the water or water and air combined, create internal stress systems adverse to the integrity of the pipe line.

Thus an object of this invention is to improve the structure of cast-in-place concrete pipe-lines while at the same time using full advantage of the cost savings features the art of the cast-in-place systems offers.

These and other objects will be apparent from the drawings and the following description thereof. Referring to the drawings, which are for illustrative purposes of embodiments of this invention;

FIGURE 5 is a vertical elevation of the continuous concrete pipe-line laying machine train of this invention;

FIGURE 6 is an enlarged cross-section of a portion of FIGURE 5;

FIGURE 7 is a partial longitudinal enlarged section of a portion of the apparatus of this invention;

FIGURE 13 is a longitudinal section of a venturi embodiment of this invention;

Figure 18:
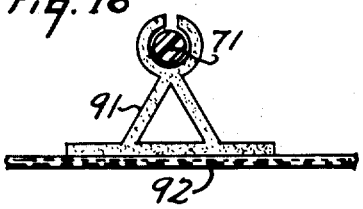
Figure 14B:
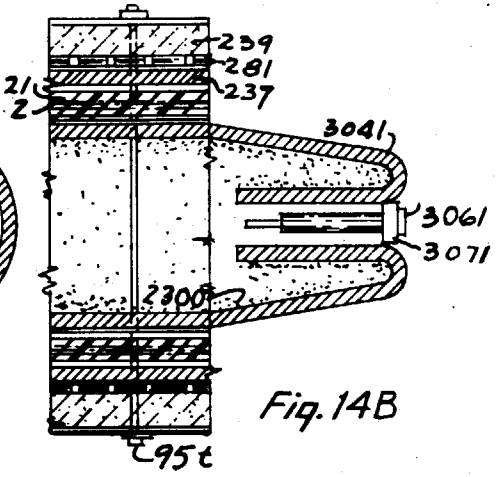
FIGURE 14 is a cross-section and FIGURE 14a is a partial longitudinal section of another mandrel torpedo-like inflating device of this invention.
Figure 14A:
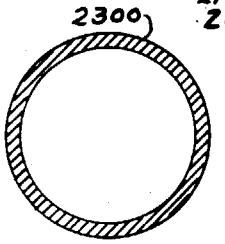
Figure 26:
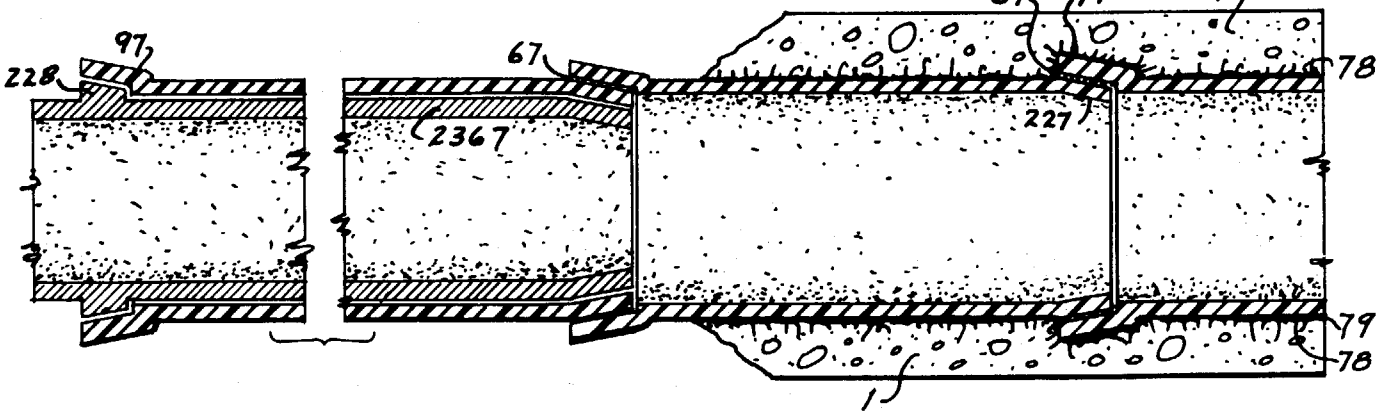
Figure 19:
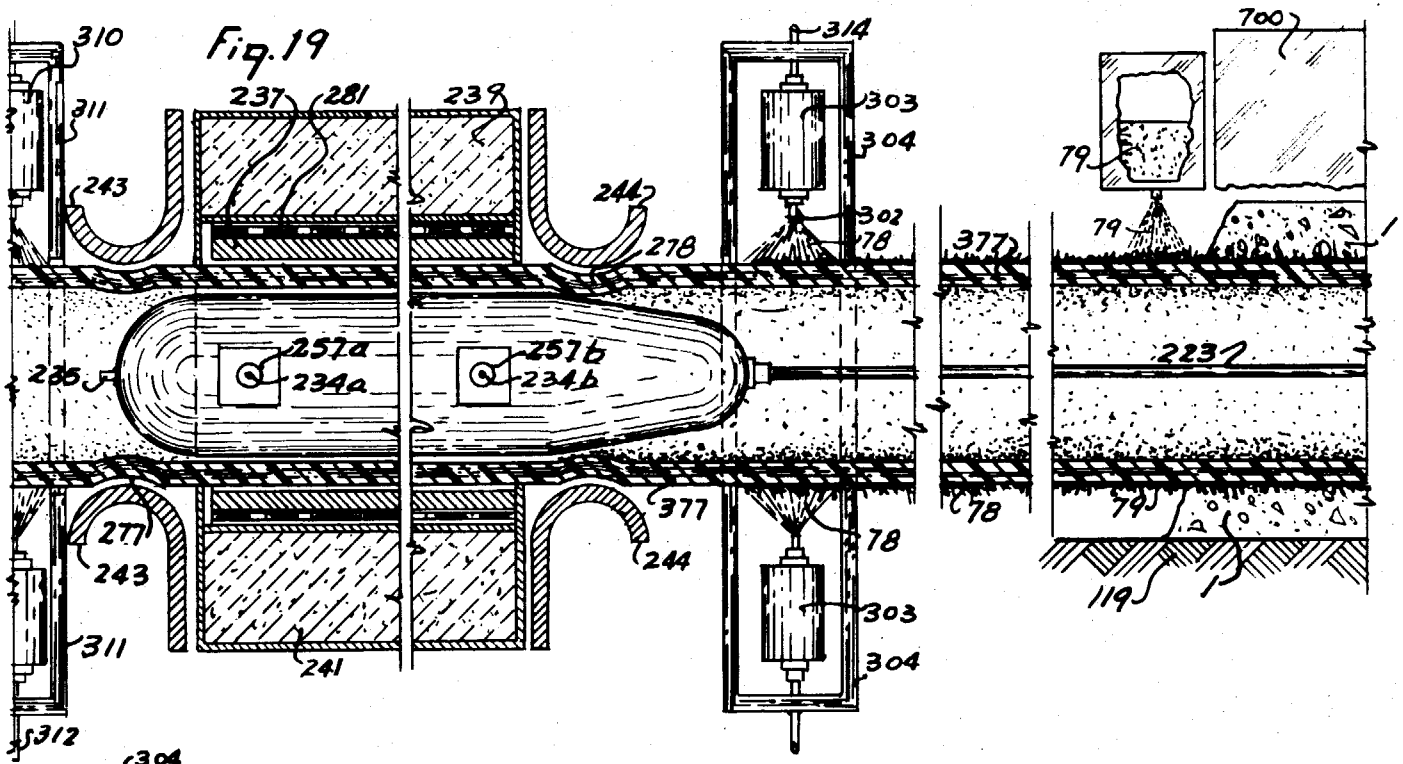
Figure 20:
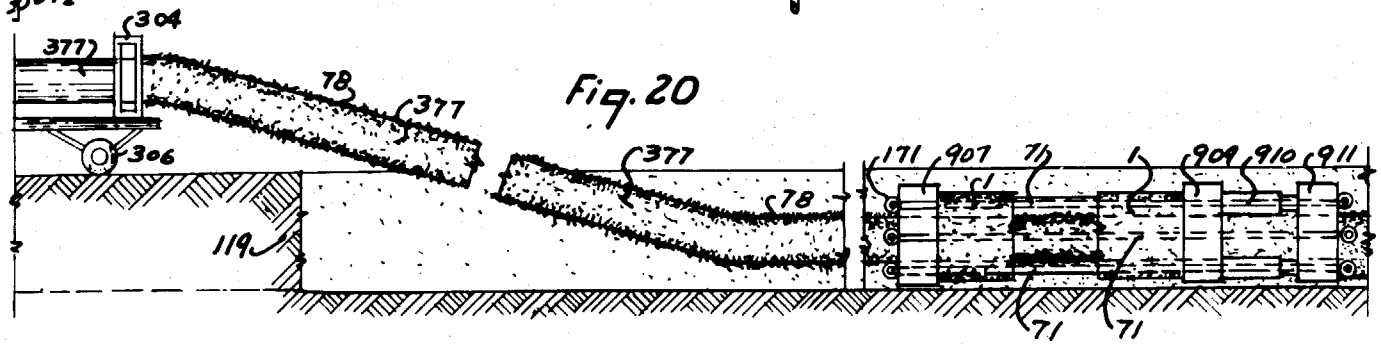
Figure 21:
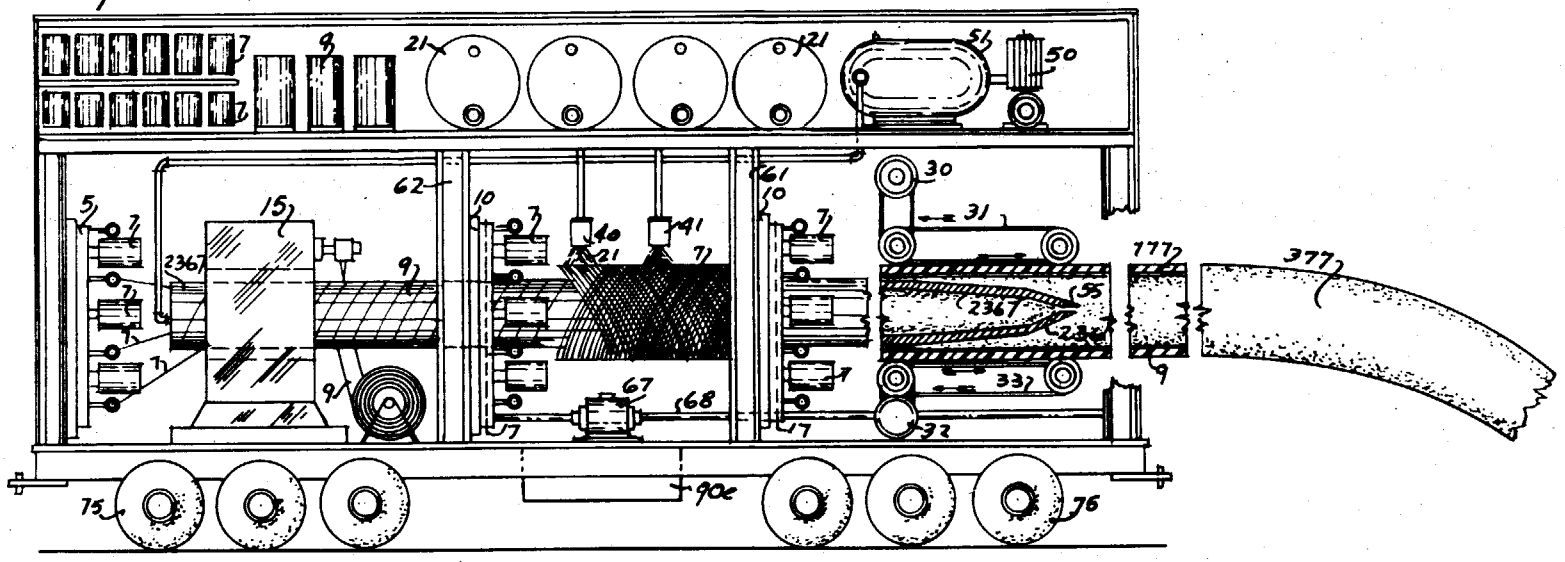
Figure 24:
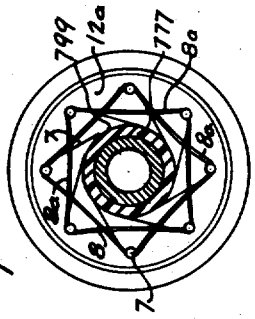
Figure 23:
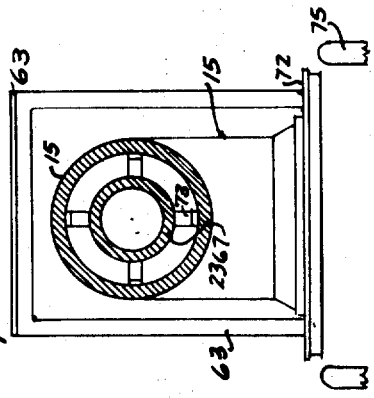
Figure 22:
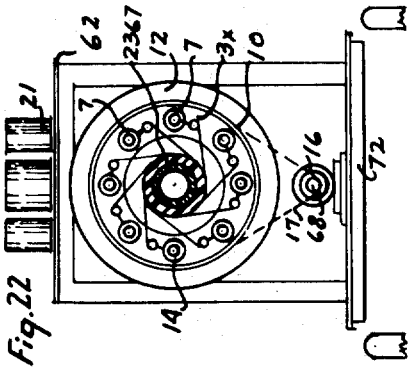
Figure 27:
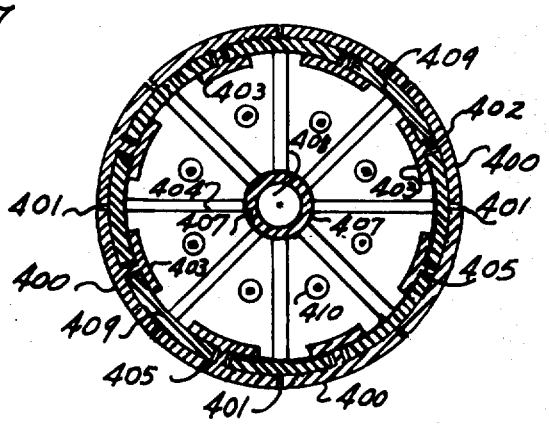

FIGURE 14*b* is a partial longitudinal section of the after end of said mandrel torpedo-like inflating device of this invention;

FIGURE 15 is a cross-section and FIGURE 15a is a partial elevation of a prestressed preloaded embodiment of this invention;

FIGURE 16 is another cross-section and FIGURE 16a is a partial elevation of a prestressed preloaded embodiment of this invention;

FIGURE 17 is a partial elevation of reinforcement holding strap;

FIGURE 18 is an elevation of an enlarged view reinforcing cable chair;

FIGURE 19 is an enlarged view of pipe-liner forming apparatus of this invention;

FIGURE 20 is an enlarged view of pipe-liner placement and of prestressed preloaded construction adapted to a portion of said pipe-liner;

FIGURE 21 is a diagrammatic view of another type of apparatus used in providing on-site or near on-site manufacture of pipe-liners of this invention;

FIGURE 22 is a diagrammatic view of elevation of spinning apparatus of this invention;

FIGURE 23 is a sectional elevation of a mandrel torpedo-type holding means and mandrel in section of this invention;

FIGURE 24 is a cross section of a finished product of this invention;

FIGURE 25 is a cross section and FIGURE 25a is a partial longitudinal section of a finished portion of an embodiment of this invention wherein the pipe-liner is made to a pre-selected length and has a bell and spigot end construction;

FIGURE 26 is a longitudinal cross-section of the mandrel and pipe-liner made thereon wherein the pipe-liner has bell and spigot ends;

*FIGURE 27 is a cross-section of an expandable mandrel;*

Figure 28:
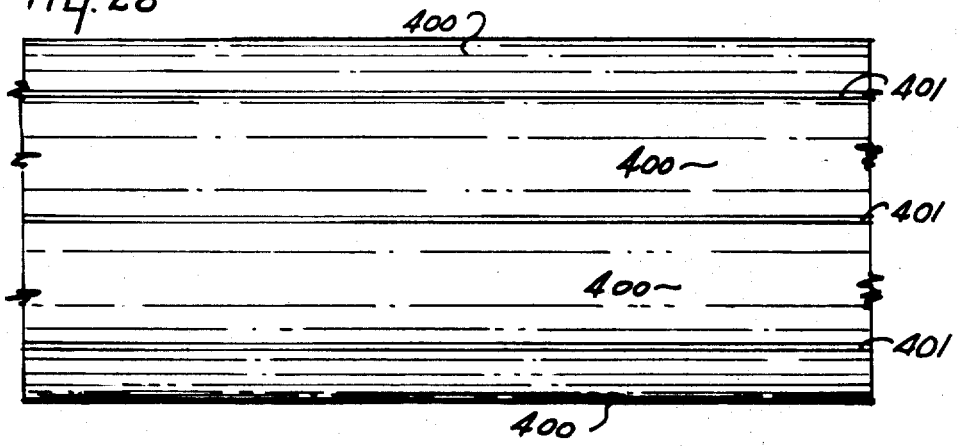

*FIGURE 28 is a portion of a longitudinal view of the expandable mandrel shown in FIGURE 27.*

In prior art the method of making cast-in-place concrete irrigation and the like, pipe lines are expanded by the use of long length tubular inflatable forms of flexible material such as reinforced rubber closed end tubes, which tubes are placed in a pre-dug trench just ahead of a continuous concrete pipe material placing machine. This tube is extended into said machine, or said machine advances over said tube, the tube being inflated to a required amount, e.g., 3 lbs. to 10 lbs. air pressure, which pressure makes said tube rigid enough to support the load of wet poured concrete supplied through the placing machine. The placing machine is fed wet concrete mixture from a field provided source of mixing the same or by truck-mixers supplying said concrete pipe making machine in sequence as needed as the said pipe making machine is pulled over said inflated tube. The outside of the tube is covered with a release powder so that when the concrete pipe-line is set and cured, the inflated tube can be deflated and withdrawn from the finished pipe.

Also in the art connected short lengths of metal tubes, e.g., aluminum, utilized as removable forms are layed in a pre-dug trench and when the machine has completed sections of concrete pipe line in said trench, the metal sections are removed. The cost of placing such forms is considerable and not only involves the use of the forms themselves, but involves smoothing and surfacing areas of finished pipe to overcome ridges or irregularities caused by misalignment or bent sections of the metallic forms resulting in uneven surfaces in the finished pipe.

In my Patents No. 2,671,158, 2,951,006, 3,111,569, and in other of my patents and applications pending, I disclosed and claim embodiments of pipe line structure wherein I provide particular packaged-ready-for-use tubular pipe-liners comprised of fiber reinforced construction embedded in polymerizable polymeric resin compositions. These embodiments are provided on reel-units or in packaged assembly. The state of particular embodiments thus provided varies with the type and kind of end structure provided as an end use product. There are different methods for making the same composite structure provided in these patents and in the improvements provided in the instant invention, and in my copending application Serial No. 391,987, filed August 25, 1964, and in my copending application Serial No. 392,075, filed August 19, 1964, the parent application to this application. The method of making partially cured ready-for-use pipe-liner constructions as disclosed and claimed in my copending application Serial No. 391,987, filed August 25, 1965 now U.S. Patent No. 3,250,654, is considered as a part of this application, and provided therein is an alternate method of providing the pipe-liner construction used in this invention. This improvement of making pipe-liners on-site following the digging of the trench is a cost reducing method. When it is impractical because of terrain covered to utilize the apparatus and method of Serial No. 391,987, filed August 25, 1964, the wheeled trailer type apparatus is placed nearby and obviates long hauls of pipe-liner constructions. The pipe-liners are provided in suitable length sections and may be made with integral bell ends and spigot ends so that by slipping a bell end over a spigot end a continuous pipe can be made. The existing concrete pipe making apparatus in the case of aluminum or metal forming means utilizes sections of tube about four or five feet long. Other apparatus utilizes rubber or rubber-like tubes from short lengths to 300 feet long and even to 1,000 feet long. Certain existing apparatus can be used as is in the present state of the art, i.e., in combination with the means of this invention. Existing metal forms are used without inflation and are temporary braced.

Pipe-line structures having diameters of from about 6" in diameter to 20 feet in diameter are made by this invention, but not limited thereto, the major uses being in the range of 12 to 72 inches in diameter.

In the practice of this invention, a trenching machine having a tractor or other driving means of moving ahead is provided to first dig a trench of required size and shape. Attached to this tractor or other driving means, and following the trenching or ditching machine is the trailer or mobile unit on which is found the machine and materials providing the pipe-liner construction of this invention. Following the pipe-liner trailer is found the concrete placing machine which is supplied from an in-place mixing plant or by truck type concrete mixing machines. The trenching machine, the pipe-liner trailer and the concrete placing machine are all connected by cables and are moved forward by the tractor of the trenching machine. Alternately, each machine may be self propelled and operated in the sequence obtained when all machines are connected together. On-site features and conditions of manufacture of the completed pipe line will dictate operations.

The instant invention is directed to making an integrated pipe-line structure [on-side] *on-site* by supplying or providing on-site a pipe-liner component which first acts as a forming means for the pipe construction whereby wet concrete is placed around, under and over the said pipe-liner construction, and second, remains in place as originally placed as a reinforcement of the composite concrete and fibrous reinforced polymeric resin composition comprising said pipe-liner. The pipe-line structure made is a reinforced composite concrete pipe. The component parts of the materials of construction are used in sequence, or provided in sequence, and remain in placed position as placed. No wasted labor or material occurs in the method of manufacture. The concrete placing machine finishes the exposed surface of the poured concrete.

The extraordinary high strength reinforcements provided and the improvements in the body structure of the concrete component of the composite structure of the invention made by improving the tensile strength of the concrete material by incorporating polymerizable polymeric resin compositions in accordance with a structural design in the manner of the invention, provides very substantial improvements in product and very substantial reductions in cost. Irrigation pipe-lines and high pressure pipe-lines are improved and have increased features of functionality as well as improved pipe structure. Substantially, complete impermeability of the pipe wall is achieved in this invention. Leakage from the inside out or from the outside in its stopped. The high smoothness feature of the pipe-liner 377 increases flow properties materially of the pipe-line structure.

Figure 1:
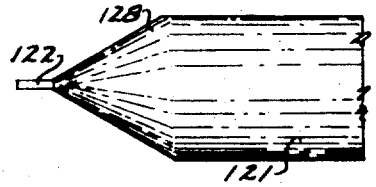
FIGURE 1 is a partial elevation of an inflatable pipe-liner embodiment of the invention.
Figure 1A:
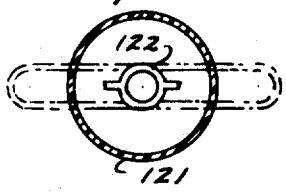
FIGURE 1a is a cross-section of FIGURE 1 of this invention.
Figure 1B:
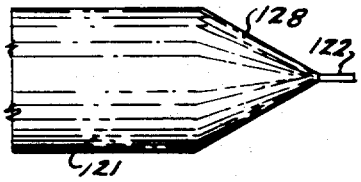
FIGURE 1b is a partial elevation of said inflatable embodiment of the invention.

Referring now to the figures of drawings of this invention, the method and apparatus used is disclosed as follows:

FIGURE 1 shows a cross-section and partial elevation of a pipe-liner 377 tubular reinforcing and surfacing construction of this invention. This tubular reinforcing comprises a laminated tubular component structure having fibrous reinforcement embedded in polymerizable polymeric resin composition provided in packaged condition in ready-for-use state as shown in my Patent No. 2,951,006 and may have features of other of my invented constructions as shown in my Patents No. 3,111,569 and 3,177,902. Additionally, it may be supplied as a product made by the method of my patent application No. 391,987, filed August 25, 1964, now U.S. Patent 3,250,654.

In FIGURE 1 element 121 represents an inflatable envelope type of pipe-liner 377 with element 122 illustrating the feed tube for inflation of the construction. Element 128 represents the tapered portion of the end of the tubular reinforcing and surfacing means and is sized at the angle of between 30° and 45° as related to the diameter of the tube which avoids bulging when said tube is inflated. In practice the amount of air pressure required for inflation of pipe-liner 377 for the thinnest type of liner I can make is about 3 lbs to 10 lbs. air or fluid pressure, but not limited thereto, as other pressures may be used. One example of such a construction comprises glass fiber reinforcing strands embedded and covered with a polymerizable polymeric resin composition or e.g., epoxy resin composition or e.g., unsaturated polyester resin composition as disclosed in my patents supra, but not limited thereto, as e.g., rubbery materials, butyl rubber or elastomeric polymeric resin compositions may be used alone or in combination with other thermoplastic resin compositions and thermosetting resin compositions.

In starting the manufacture of the composite concrete pipe-line structure, an amount of pipe-liner 377 is pulled from the reel unit through rolls 372 and 376. The end of the pipe-liner 377 has its elements 122 and 128 cut-off so that the pipe-liner 377 in its full diameter can be attached to the bulk-head elements 215–216 as shown in FIGURE 7. Before attaching the pipe-liner 377 to the said bulk-head 215–216, the mandrel 236 and the air hose connected to it are inserted into the open end of the pipe-liner 377. A sufficient amount of pipe-liner 377 is processed through the oven and over the mandrel to make it a set and cured polymeric resin composition fiber reinforced pipe-liner 377 construction. Alternatively, the pipe-liner 377 construction is processed into a partially cured construction so that additional elements and components of specific constructions can be incorporated into the pipe-liner or concrete and pipe-liner 377 construction after it leaves the oven by integrated bonding processes. In either case the pipe-liner 377 is sufficiently strong to be used as shown and will hold air pressure or fluid pressure if the same is needed to support the load of the covering material or concrete 1.

Figure 3:
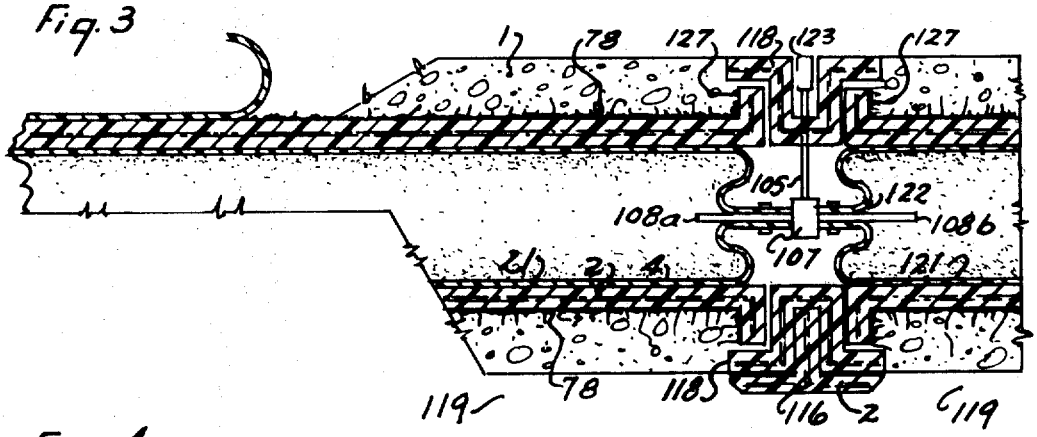
FIGURE 3 is a longitudinal partial section of an embodiment of this invention showing means of joining two ends of two pipe-liners together.

The bulk-head 215–216 has connections for the air hose or fluid means 233 which is further connected to the air compressor or fluid means outside the bulk-head. The tubular pipe-liner 377 can be connected to additional lengths of the same by several means. Element 127 represents one such means wherein the pipe-liner 377 has its end bent backward to a right angle as shown in FIGURE 7, with the flange of the bulkhead 216 serving as support for the element 127. Two such ends are connected one to the other as shown in FIGURE 3 wherein is shown an expansion joint having elements 118 and 127, and as shown in the lower portion of FIGURE 3 wherein is shown elements 2, 116, 118, and 127.

There are further means exampled herein but not limited thereto and provided in this invention wherein a tubular pipe-liner 377 is connected to another pipe-liner 377 by means of the tubes 122 formed as a part of the two ready-for-use constructions. When a length of pipe-liner 377 is placed in final place of use the concrete 1 component of the construction is placed around, over and under said pipe-liner 377. As shown in FIGURE 19, the exterior surface of the pipe-liner may have a layer of polymerizable polymeric resin composition or other type layer applied to said surface after the formed pipe-liner 377 leaves the oven. The material may be highly adhesive so that in a portion of the apparatus just before the pipe-liner 377 enters into the concrete placing machine, sand or sand and Portland cement, or any other bonding medium may be placed onto the pipe-liner 377. In the combination of the pipe-liner 377 and the concrete 1 "fingers" of polymeric resin composition or composite material "fingers" are provided by the rough surface made or by the nature of the materials having capability to penetrate and permeate the concrete 1 forming secure anchorages in the said concrete structure thereby. Additionally, composite structured material is provided in the combination of the polymerizable polymeric resin composition and the fibrous reinforcements and the concrete material. Co-mingling at the interface to selected designed depths of composite construction is a significant feature of this invention. The exterior application of highly adhesive materials with its bonding and penetrating and permeating characteristics at least at the interface between the concrete and the pipe-liner 377, but not limited thereto because in certain embodiments of this invention, substantially penetration and permeation can extend clear through the concrete body. Additionally, when I use a concrete having e.g., a polymerizable polymeric resin for its aggregate binder, the resulting composite structure pipeline comprises a balanced designed polymeric resin composition or compositions having embedded fibrous reinforcements or metal and fibrous reinforcements in combination and concrete 1 material bonded together by said polymerizable polymeric resin compositions.

As shown added lengths of pipe-liner 377 are connected one to the other by means of fitting 107 having connecting tubes 108a and 108b which are connected to end tubes 122 of tubular body 121 by means of clamps and means 109–110. Air or fluid intake fitting valve 123 serves as means of adding pressure by moving hose 703 from air compressor to connect it into the added section of pipe-liner 377 and the process of covering the tubular pipe-liner 377 and placing the concrete 1 about said tube can again proceed. As pointed out herein, when the air pressure is needed to supplement the strength of the tubular pipe-liner 377 it acts as an additional supporting means over that supplied by the pipe-liner 377.

By design and intended types of use, the pipe-liner 377 can be provided having different capabilities to resist internal pressures by reason of the kind of and amount of fibrous materials used or metal components used, or polymerizable polymeric resin compositions used. Particularly, specific features of the invention can be provided by a plurality of polymeric resin compositions compatibly used or functionally used in the manner of the invention. By design the selection of the materials of the construction of pipe-liner 377 and concrete 1 and features of prestressed preloaded structures as in FIGURE 20 are provided in a structurally engineered manner combined with the chemical engineering manner of the arts.

Capabilities of structure of the composite pipe-line of this invention can be many. As to pressure capabilities, for irrigation pipe systems internal pressure resistance can be from a nominal 0 lbs. to e.g., 50 lbs. with minimum thicknesses of pipe-liner 377 used. Internal pressure capabilities can go to e.g., 500 p.s.i. internal pressure resistance. In either case the impermeability of the composite structure is provided. By varying the rigidity of internal structure of the invention materials, other capabilities can be achieved, e.g., shock resistance against earthquakes and the like, load-bearing capabilities over unstable or low value sub-grade soils, over-burden loads, and articulative properties and resistances provided to overcome poor tensile properties of concrete per se by increasing its tensile capacity loading characteristics, and this in the manner of my prior inventions and the instant invention. The pipeliner 377 structures can be made and are made to have specific properties adapted to resist corrosion as occurring in sewer lines, or from acid soils, or alkali soils or environments, or in fact many other environmental conditions which pipe-liner 377 design and construction can meet.

Figure 4:
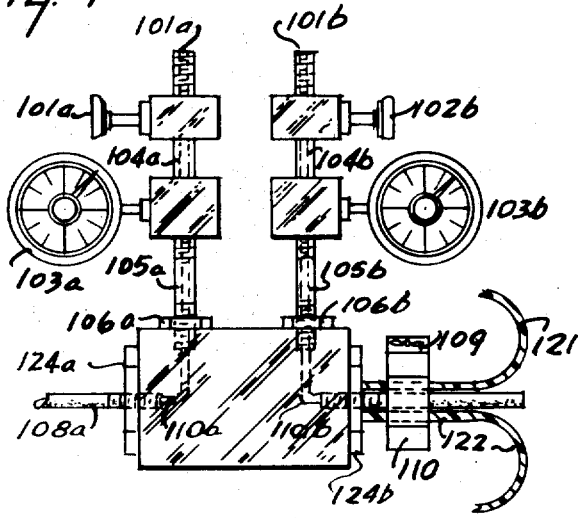
FIGURE 4 is an elevation of valved connecting device of the invention.

In FIGURE 4, apparatus is shown comprising dual air supply means comprising entrance nipples 101a and 101b, valves 102a and 102b, gauges 103a and 103b, and connecting nipples 105 and 105a connected to junction box 107 by means of holding nuts 106a and 107b and said nipples, and further, extension nipples and/or pipes 108a and 108b around which tubular extensions 122 of pipe-liner 377 are fastened to said extension nipples 108a and 108b. This dual system with common junction box 107 enables air and/or fluid pressure to be balanced inside of the pipe-liner 377 while the concrete 1 is obtaining its set state which can be several hours. By holding internal support pressure substantially equal, the concrete 1 can be cured without cracking.

Further when pipe-liner 377 is prestressed [preloader] *preloaded* by said internal pressure, a substantially uniform amount of pressure is desirable and required and is thus provided.

When the concrete 1 and the pipe-liner 377 are united into set and cured composite concrete pipe-line structure, the pipe-line can be entered and the ends of the pipe-liner 377 shown connected by the joining apparatus as for maintaining substantially equal air pressure are cut off by means of a cutting tool and the expansion joint or other connecting joint shown in FIGURE 3 is completed.

Alternatively, the method of my copending application Serial No. 391,987, filed August 25, 1964, can provide pipe-liner 377 in specific lengths, e.g., four feet, five feet long, ten feet long, twenty feet long, or in fact any desirable lengths to the amount that can be laid in one operational period, e.g., a day, and each such length may have a bell-type configuration on one end and a spigot configuration on the other end. Other types of pipe-line joinery can be used as shown in my prior art and adapted to the instant invention. Bell and spigot joinery is quickly conveniently joined together by the use of polymerizable polymeric resin compositions. The bell-type end, depending upon the diameter of any individual pipe-liner 377 construction can be e.g., 4", 6" or even 12", or in fact any structural dimension required by a design. The bell-type end can be a snug fit assembly that enables quick assembly secured in place by the use of the said polymerizable polymeric resin compositions. The bell-type end can have features involving the use of resilient rubber rings, or Teflon, polytetrafluoroethylene polymeric resin rings, etc., as known in the art but specifically adapted to this invention. An epoxy resin composition having a copolymerizable component such as a polyamide resin or a polysulfide resin or a proprietary amine setting agent is available now so that timed or quick setting and curing can be provided for bonding the bell-type end to the spigot type end of a pipe-liner 377. Because of the several available polymerizable polymeric resin systems as shown in my prior patent U.S. No. 3,236,015 and copending applications, the structural engineer and chemical engineer now has means of providing pipe-liner structure having new and better end use properties.

In the present art of thermoplastic extrusions, apparatus is available that provides thermoplastic resin compositions made into extruded pipe structure. These pipe structures can be used in the manner of thermosetting resin compositions wherein the element 9 of Serial No. 391,987, filed August 25, 1964, shown as a release film is further processed in this invention to provide a thermoplastic material as the inner surface component of a particular pipe-liner 377, or if of adequate cross-section, comprise the pipe-liner 377 construction. Polymeric materials such as Lexan, polycarbonate, nylon, linear polyesters, Dacron, low density polyethylene, high density polyethylene, polypropylene, polyvinyl chloride, and polystyrene or even cellulose acetate can provide polymeric materials of the instant invention. These may be used alone in certain embodiments or may be used in combination or layered constructions of the invention.

The fibrous reinforcements of the invention may be provided in flat helically wound constructions or they may be provided in helically wound constructions having additional fibers as e.g., glass fiber rovings wound in pluralities of ring like constructions or helical-like constructions that are of a greater number of such rovings or strands wound in a given area of the total construction. The resultant structure has then a series of ribs as in FIGURE 22. These ribs are cable-like in nature and are reinforcing features of a particular designed pipe-line structure. The pipe-liner 377 having such ribs inherently has adequate mechanical bonding between the pipe-liner and its concrete 1 cover. Such ribs or strengthening material can be placed in or on a pipe-liner construction so as to structurally resist loading from any direction, the placement being a matter of structural design. Integrated cable-like reinforcements in a prestressed state can be thus made a part of a pipe-liner 377 construction.

Figure 2:
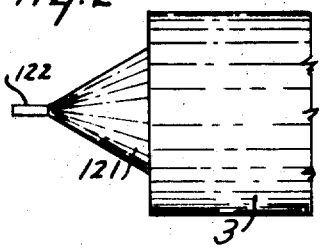
FIGURE 2 is a partial elevation of another kind of an inflatable pipe-liner embodiment of this invention.
Figure 2A:
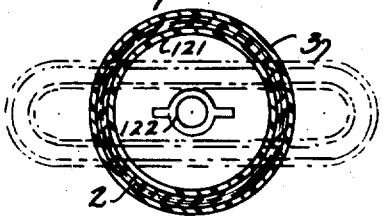
FIGURE 2a is a cross section of FIGURE 1 of this invention.
Figure 2B:
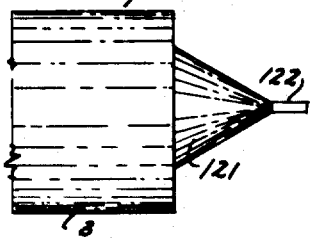
FIGURE 2b is a partial elevation of said invention.

FIGURE 2 represents a cross-section and partial elevation of a tubular pipe-liner 377 encased in a structural reinforcing means wherein element 2 comprises glass fiber or other fiber reinforcement embedded in polymerizable polymeric resin composition 21 and is packaged in between layer 3 and layer 121, layer 3 being the exterior cover and layer 121 being the interior cover. Element 125 represents a closure means for element 3 and can be heat sealed bonded connection or other equivalent means of closure, or element 3 can be a seamless or one piece tube.

FIGURE 3 shows an enlarged section taken longitudinally of an embodiment of the invention. Element 1 represents the concrete body of wet concrete poured about the inflated tubular construction pipe-liner 377. Element 2 comprises fiber reinforcing, e.g., glass fiber roving provided in helical lay and cross lay and having additional glass fiber circularly applied and bonded together by element 21 comprising the polymeric resin composition. Element 121 shows the inner layer which can be a component of the pipe-liner structure or can be a related component applied first as a mold release and left in place to protect the high polish of the inner surface of the pipe-liner structure which is obtained by the smoothness characteristic of the said related component. Element 125 represents a closure means for element 3 and can be a heat sealed or bonded connection as in FIGURE 2. In this example, element 3 is shown being removed from the pipe-liner 377 prior to the pouring of the concrete or other porous structural material about pipe-liner 377. Element 78 represents the penetration and permeation of the porous structure of the concrete body component 1 which as disclosed in my patents and copending application supra, provide very substantial reinforcement and prestressed preloading means to the composite pipe structure of this invention. Element 127 represents flanged ends to provide one type of connection between two lengths of pipe-liner 377. Elements 105 again with elements 108a and 108b, 107, and 123 represent component parts of connection and inflating means between two lengths of pipe-liner 377. Elements 116 and 118 represent joinery components for permanently or otherwise connecting two lengths of pipe-liner 377 together. Element 119 represents the earth in the bottom of the trench and in the sides of the trench or place of use upon which the entire pipe construction rests in place of final use. Since the concrete 1 is provided in its wet unset state, the interface between it and the earth 119 must be considered carefully in design so that full advantage of the properties of all the materials including 119 are utilized. Earth 119 is considered a part of the composite structure.

FIGURE 4 represents an enlarged diagram of connecting means between two tubular pipe-liner 377 constructions and has been described supra.

FIGURE 5 is a side elevation and partial section of a complete pipe making and laying train comprising a ditcher represented by element 401 which is driven by a tractor 400, which tractor pulls the pipe-liner providing machine on a trailer by means of cable 309 connected to front wheels 308 of said trailer vehicle containing the apparatus of the invention. Following the pipe-liner 377 providing trailer means [in] *is* the concrete placing and finishing machine [whice] *which* rides over the pipe-liner 377 and passes the pipe-liner through the machine where it is covered with concrete 1. Just prior to entry of the concrete placing machine the exterior surface of the pipe-liner 377 is covered with bonding material 79 which is placed over polymeric resin composition adhesive material 78 which has been applied to the pipe-liner 377 after it leaves the oven which forms pipe-liner 377. The location of these elements are not critical but elements 78 and 79 are needed when certain types of composite structure pipe is made. When the rib type structure is made as an embodiment of pipe-liner 377, certain constructions will not need 78 and 79. Element 90e represents a diesel-electric power source for heat and electricity.

Mounted on the vehicle, standard support 371 holds in the reel unit the tubular pipe-liner 377 in a rolled up condition. The pipe-liner 377 is fed off from the reel-unit and is passed through rolls 372 and 376, the reel-unit being mounted on axle 375 supported by braces 373. On leaving the rolls 372 and 376, the tubular pipe-liner 377 is inflated by means of air pressure or fluid pressure. coming from the mandrel 236 which is mounted in curing chamber 241. As shown in FIGURE 19 the spring type pressure elements 243 and 244 exert pressure upon the pipe-liner 377 at points on the liner 277 and 278. As shown in FIGURE 6, the oven is a circular piece of apparatus and is hinged at 240 and locked together at 242. The pressure exerted by the elements 243 and 244 is sufficient to hold the pipe-liner 377 in a fixed position while the polymeric resin compositions of the pipe-liner are cured to a partial state of cure or are cured to a full state of cure depending upon the kind of a resin system then in use. In my copending application Serial No. 391,987, filed August 25, 1964, now U.S. Patent 3,250,654, the preferred method of manufacture is to bring the pipe-liner 377 to a partial state of cure so that additional processing carried on in this invention results in a composite structure having an integrated and bonded composition. In certain embodiments initial layers of a composite pipe-liner 377 structure may be cured as in oven in FIGURE 5 and FIGURE 6 to a full state of cure because of being placed on the mandrel 236 which may contain heated air or fluid. Additional layer or layers may be cured to a partial state of cure or may even be uncured polymerizable polymeric resin composition, rubber, or elastomeric resin composition. The fibers used, e.g., glass fibers are held in place in either layer and are not affected by heat in the curing temperatures of the polymeric resin compositions, rubber, or elastomeric resin compositions suited to any of the specific formulated compositions used. Control of heat is accomplished by known thermostatic means and time in the oven is concentrated to pre-selected periods of time. Also, certain resin systems may be cured at ambient temperatures.

Alternatively, the polymerizable polymeric resin compositions, the fibers, and the fillers if used, can be selected in specific formulation so that a continuous process comprising passing pipe-liner construction 377 over the mandrel 236 at a specific rate of speed and providing it formed ready-for-use for application of bonding material, e.g., polymerizable polymeric resin composition 78 and later at the entrance to the concrete placing machine, the application of binding and bonding materials 79 to the surface of the formed pipe-liner 377. The apparatus 236 comprising the mandrel and the apparatus 243 and 244 represent means of mechanically holding the pipe-liner 377 in this processing step. The drawing FIGURE 19 exaggerates the depression formed in the pipe-liner 377 by the pressure means which depression is shown at 277 and 278. The mandrel 236 as shown in FIGURE 19 has a rounded front end and a tapered rear end. The location of the pressure means 243 and 244 is such that the pipe-liner 377 is engaged under pressure at the round front end and the tapered rear end. Other means of holding the mandrel in position during the curing process are available and disclosed herein.

As shown in FIGURE 5 tanks 316, 315, 317 and 318 contain chemical components of the resinous materials of the invention then being used. These materials are shown dispensed by spray means but may be dispensed by any other means known in the art, e.g., dipping the fibers, spreading, by doctor blades, laminating, painting, mechanical brush systems, electro-static spray systems, pressure spray systems, or in fact any other means may be employed in the manner of the invention. Element 310 represents the spray device mounted on frame 311 and is fed from tank through hose 312. The torpedo-like mandrel 236 as enclosed in the oven is supported on frame 325 having braces 305. This frame is adjustable so as to allow for horizontal placement of the oven and mandrel and for more or less slope in placement of the oven and mandrel so any desired manufacturing feature can be carried out.

Spray units 303 and 304 cover the outer surface of the tubular pipe-liner 377 after it leaves curing chamber oven 241 so that at element 701, the sprayed material may be covered with sand or Portland cement and sand, or other useful materials to effect bond with the poured concrete as the concrete component is formed over the inflated tubular pipe-liner 377, which bond is shown as being at the interface between the concrete 1 and the said tubular pipe-liner 377 at 78 as well as into the concrete 1 effecting a very strong bond therewith, and as at 79.

Element 223 comprises an air feed tube or other fluid feed means whereby the tubular pipe-liner 37 is inflated by means of this embodiment of apparatus. Element 702 shows the smoothing means of a known pipe laying machine and element 777 shows the finished top surface of a poured and finished construction.

FIGURE 6 shows an enlarged section of the construction of an embodiment of the invention wherein 121 shows the interior laminated layer component retaining fibers 2, e.g. fiber glass strands, embedded in polymeric resin composition 21, e.g., unsaturated polyester resin composition, or epoxy-polyamine resin composition, or a polyvinyl chloride resin composition. These materials may be in combination and enclosed in an envelope 3. Element 3 may be an aluminum or other rigid material capable of holding the tubular element 377 in fixed size position or it may be cured entirely or may be cured partially depending upon the specific embodiment then being made as the reinforcing and lining components comprising the pipe-liner 377 of the composite pipe construction. Element 237 may have attached thereto heating elements 281 and be encased in element 239 which is an insulating construction for retaining heat or otherwise controlling the curing or partial curing of the polymeric resin compositions of this invention. By the nature of certain polymerizable polymeric resins substances the cure cycle of these substances can be initiated by catalyst means, or co-polymerizable means, or with heat, or with reactive materials. Time of curing can be varied as is known in the art by the amounts of curing agents supplied, or by the environmental factors provided in any given process. As is known, partial curing can be done in one stage and completed in another, as e.g., epoxy resin compositions or unsaturated polyester resin compositions which are first made as "B"-stage materials, i.e., partially polymerized, can be completely polymerized at a later stage. The use of setting means or catalysts, or curing means which e.g., operate at elevated temperature enable manufactured components being in the "B" stage of cure because heat used in elevated temperature curing can be removed prior to completion of a cure cycle and the cure can be resumed at a later time or other place by providing the amount of heat needed to complete system cure. Pipe-liner 377 with respect to its fibrous components alone can be supplied on the reel-unit, and as shown in FIGURE 5 be covered and impregnated with polymeric resin composition just ahead of the oven by apparatus 310.

Alternatively, the fibrous components of pipe-liner 377 can be partially or wholly covered and impregnated with a polymeric resin composition and set to a "B"-stage and when supplied on a reel-unit be inflated and processed through the apparatus of the instant invention.

FIGURE 7 shows an enlarged longitudinal section of components of this invention. Forming means 236 comprises a mandrel having a forward port 233 and side ports 234a and 234b, and may have additional apparatus as will be later shown. One use for these features can be the emission of air or fluid from the mandrel to release or inflate the tubular construction pipe-liner 377. Mandrel 236 is a forming means used in combination with the oven 241 and is maintained in position by apparatus of oven 241, or by electronically operated or electrically controlled, or otherwise operated magnetic devices or proximity switches operating ferromagnetic metal sensitive switches, as e.g., procurable from the Honeywell Controls Corporation, Micro Switch Division, of Freeport, Ill. Specialized elements of these kinds of apparatus are available particularly designed for temperature gradients and spacing of elements of the instant invention. Improved double sheet detector type proximity switch system plus magnetic device holding systems could include two sensor components, an amplifier, a relay and a magnetic holding device. Such a device and system is represented in FIGURE 19 by elements 257a and 257b.

The forming means mandrel 236 is connected to feed line 223 which extends through bulkhead 215 which is a part of supporting end bulkhead 216. In this example, air compressor 704 supplies air under pressure through line 703. Entry portion of air or fluid line 703 is shown at 208 and feeds into entry control unit 210 which also has fine control valve 209 so as to substantially maintain a constant pressure in the system.

Construction of the pipe-liner 377 can [very] *vary* as the needs of the use dictate. The example shown in FIGURE 7 shows pipe-liner 377 under pressure and expanded around the mandrel 236 with a portion shown in the mold 241. In the molding means 241 element 237 comprises an aluminum plate platen curved to the shape of the pipe-liner 377. Other platens may be used made of other material. This platen is heated by electrical means wherein strip heaters are spaced around the platen shown as elements 281. Other means of heating may be used, e.g., steam, hot water, hot air, internal temperatures induced by catalysts or curing agents wherein the polymerization reaction provides heat to cure the particular polymeric resin composition, or radiant heat may be used, or sunlight may be used after the tubular construction pipe-liner 377 is formed into shape, or in fact any other useful means may be used. The degree of cure, whether partially cured pipe-liner 377 is made or whether portions of the pipe-liner construction are cured and portions partially cured, or whether the pipe-liner 377 is fully cured in this stage of manufacture is a matter of design. The apparatus and available materials can provide either product.

The right hand portion of the FIGURE 7 shows a sectional view of the composite pipe construction pipe-liner and concrete 1 after all the materials are in place. The bottom of the trench 119 is supporting the poured-in-place-concrete 1 which is shown in section surrounding pipe-liner 377. The bounding materials 78 and 79 comprise "finger-like" resinous materials and/or Portland cement, and/or Portland cement and sand mixture, and/or polymeric resin composition, sand and cement, or in fact any other useful binding and bonding means when the use of the components of the invention are so used. In the case of ribbed or exposed cable reinforcements used to reinforce the composite structure of examples of this invention, certain embodiments will rely on structural mechanically provided anchorage of the pipe-liner 377 and its reinforcing means to the concrete 1. Also concrete 1 in certain embodiments will have shrinkage and in setting and curing will prestress preload the pipe-liner 377. When polymerizable polymeric resin compositions are used in place of Portland cement as the binder in the concrete 1, these materials will have in certain specific formulations, the necessary bond strength making unitary structure out of the pipe-liner 377 and concrete 1 cover.

Polymerizable polymeric resin composition element 21 is shown embedding fibers 2, e.g., glass fiber uni-directional strands, contained in envelope 3. In this embodiment, envelope 3 is melted by the temperature of the polymerization reaction and co-mingles with the polymeric resin composition 21. In other embodiments it may be a peel-off type of envelope in use as a protection cover and being removed before final stage of process is done. Other types and kinds and features of embodiments will require other envelope materials and functions.

A flange embodiment 127 is shown but the construction is not limited to flange type connections or as shown. The art and my prior art shows other means of connection between two lengths of pipe-liner 377.

Figure 8:
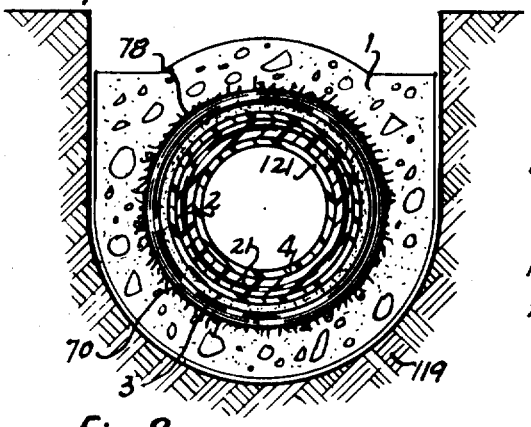
FIGURE 8 is a cross-section and FIGURE 8a is partial longitudinal section of an embodiment of this invention.
Figure 8A:
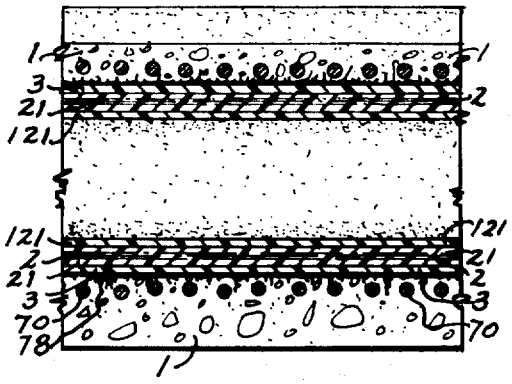

FIGURE 8 shows a cross-section and longitudinal section of an embodiment of this invention wherein the tubular construction pipe-liner 377 is found as in FIGURE 7 and in addition has spiral wrapped reinforcement 70 provided on the exterior surface of pipe-liner 377. This reinforcement 70 is made of glass fibers or of synthetic fibers or of metallic wires or, in fact, any other useful material.

Figure 9:
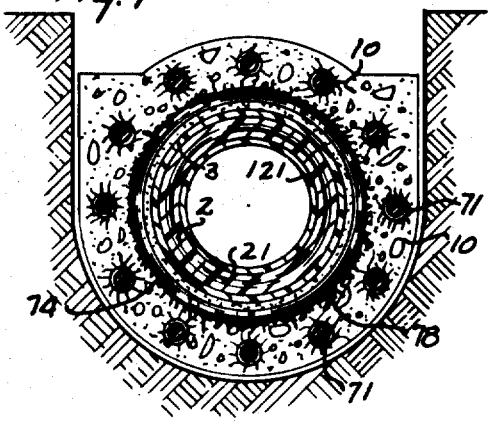
FIGURE 9 is another cross-section and FIGURE 9a is a partial longitudinal section of an embodiment of this invention.
Figure 9A:
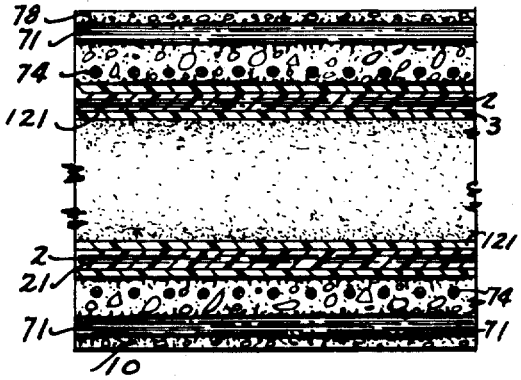

FIGURE 9 shows a cross-section and longitudinal section of another embodiment of the instant invention wherein in addition the construction of FIGURE 8, these reinforcing means employ longitudinal prestressing cables 71. These cable-forms have end-enlargements 171 in which bearing holes 172 are found and are shown in my U.S. Patent No. 3,111,569. While FIGURE 8 shows concrete 1 representing conventional concrete, FIGURE 9 shows concrete 10 comprising a functional concrete particularly adapted to balanced prestressed preloaded construction. The composite pipe of this embodiment comprises prestressed preloaded pipe adapted to substantial resistance to internal pressures.

Figure 10:
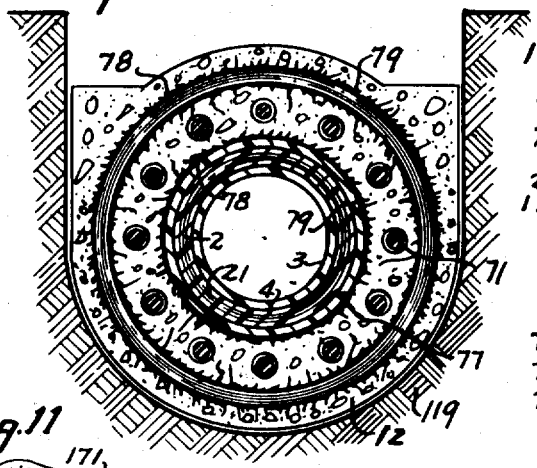
FIGURE 10 is another cross-section and FIGURE 10a is a partial longitudinal cross-section of an embodiment of this invention.
Figure 10A:
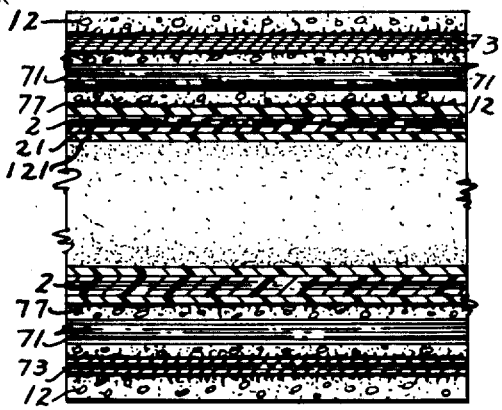

FIGURE 10 is another embodiment of this invention wherein prestressing cable-form 71 is utilized in spiral wrapped type of constructions on the outer face of the tubular construction pipe-liner 377. These reinforcing means provide prestressed structure in the composite concrete pipe of this invention as well as tanks, vessels, etc., of this invention. Concrete 12 of FIGURE 10 represents still another kind of concrete 1 of this invention and may be a concrete made by using polymerization polymeric resin composition as the binder and omitting the use of Portland cement. In this case specialized aggregate may be used. Such aggregate could be heat resistant mineral material, pumice, or tufa, or volcanic ash, Carborundum, aluminum silicate, lead minerals, lead powders, lead granules, metal granules, or could be glass beads, quartz particles, silicon-carbide particles, asbestos, antimony oxide, calcium carbonate, calcium sulfate, magnesium carbonate, microspheres, made of high silica glass pure silica, phenolic, urea-melamine, or syntatic foam materials, rock, or man-made aggregates lightweight concrete aggregates such as fire expanded clay or fire expanded shale, etc. Inorganic hollow beads and aluminum powder and silicone or phenolic resins can be used in certain specific constructions of the inventions. Sodium and potassium silicates, silica sols, oxysulfate and oxychloride cements, calcium aluminate cements and phosphate cements can be used as bonding and binding agents. Low-density inorganic materials such as lightweight ceramic aggregate, amorphous minerals such as tripolite, infusorial earth, silica, perlite, oolitic limestone, pisolitic bauxite and heat-expanded mica or, vermiculite can be used. Graphite can be used in making heat resistant polymeric resin bound concretes.

Figure 11:
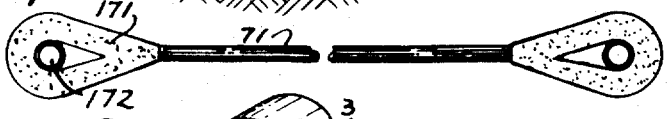
FIGURE 11 is a partial elevation of a non-metallic fibrous reinforcing cable adapted for use in making prestressed preloaded constructions of this invention.

FIGURE 11 represents a cable-form having two end-enlargements 171, two bearings 172 and continuously wound under uniform tension fibrous strands 71 and is shown, e.g., in my U.S. Patent No. 3,111,569.

Figure 12:
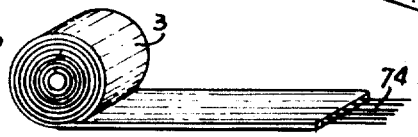
FIGURE 12 is an isometric view of a roll of ready-for-use prepared non-metallic reinforcement used in this invention.

FIGURE 12 represents a roll of belt-form reinforcing showing element 3 as a protective cover and elements 74 as unidirectional strands of reinforcing material. This embodiment is shown in my U.S. Patent No. 2,671,158, 2,951,006, and 3,111,569 with improvements. These ready-for-use constructions when provided in tubular construction as in pipe-liner 377 make component parts of the instant invention. The practical use of glass fibers and polymeric resin compositions and the other materials of this invention in some embodiments of the new art herein is only possible by the means of packed-ready-for-use components disclosed herein.

Figure 14:
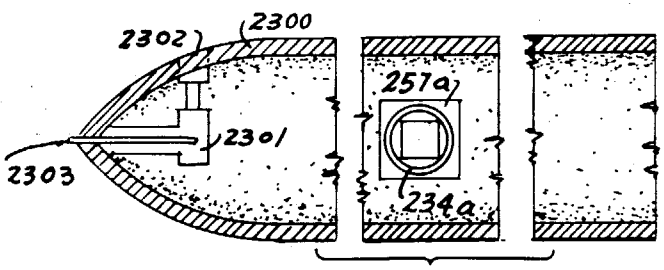

FIGURE 13 is a partial section of a venturi shaped forming means adapted to pressure fluid systems, the venturi section being shown at 1300a with 2300 representing the forming chamber of a piece of apparatus as shown in FIGURE 14.

FIGURE 14 is a longitudinal cross-section partially shown with a cross-section of the apparatus circular in section interposed between the two ends of the embodiment. This apparatus comprises a steel or aluminum or, in certain uses a reinforced plastic tank, and is used as the mandrel about which the pipe-liner 377 is made, or completed from a partially prepared state as supplied on a reel unit. The outside diameter of the mandrel 236 or this mandrel 2366 provides the inside diameter of the pipe-liner 377, which e.g., could be 12", 16", 18", 24", 30", 36" or in fact any required diameter bore for a composite pipe of this invention. As element 2366 used as in the manner of 236 in FIGURE 5 but without the attached hose 223, this embodiment of apparatus provides fluid or air pressure by self-contained means, and this to inflate the tubular construction pipe-liner 377 when it is desired to include air pressure or fluid pressure in the process of making.

This tank is adapted to provide air or fluid by which to inflate the tubular construction pipe-liner 377 and aid in the release of the pipe-liner 377 from the mandrel by providing a layer of air between the mandrel surface and the said pipe-liner 377. Element 2301 comprises an orifice device having port 2303 and feed device 3061 contained in holder 3071 which is secured by portions of the said tank element 2366 by its own walls being inverted inwardly by shaped portion of said tank element 3041. The wall thickness of the tank element 2366 comprising the mandrel is related to the pressures required to withstand its internal pressure capability and can withstand pressure required in the art.

The length of tank element 2366 as a mandrel is such that a portion of the continuous length or a long length of tubular construction pipe-liner 377 is expanded from the flat as it comes from the reel-unit shown in FIGURE 5 and as it is formed into shape between spray guns 310 and 304. The length may be convenient to a balanced designed set of apparatus provided on the transporting means of the invention. A convenient length may be 10 feet long, or 30 feet long, but not limited to said lengths. The curing time of the polymeric resin compositions of the tubular constructions pipe-liner 377 determines the amount of product made at any given time, i.e., taking into account the related features of the making of composite concrete pipe by the apparatus of this invention, as well as the methods of this invention.

FIGURE 15 shows a cross-section and a longitudinal elevation like the longitudinal reinforcing means used in the structure of FIGURE 9. The spiral wound element 74 surrounds the enveloped tubular construction pipe-liner 377 and is at spaced intervals in accordance with a structurally engineered design. The prestressing cable-forms are shown in raised relationship to the surface of the pipe-liner 377 and not only provide added strength to the composite pipe structure but also provide resistance against pull out of said pipe-liner 377 by mechanical bond. These prestressing cable-forms 71 have end-enlargements 171 which have bearing holes 172 so that the cable-forms may be end-anchored and prestressed preloaded by means 907, 909, 910 and 911, the support bulkhead, the prestressing jacks, the jack holding bulkhead and the back-up bulkhead as shown in FIGURE 20.

The tubular construction pipe-liner 377 is comprised of elements 2, 3, 21, and 121 of the invention.

FIGURE 16 shows a cross-section and a longitudinal elevation of the reinforcing means used in FIGURE 10. In this embodiment, element 3 represents the envelope enclosing the tubular construction pipe-liner 377. Cable-form 71 is shown as spirally wound at an obtuse angle about the outside of envelope 3. Element 93 comprises a reinforcing-spacing chair holding belt having attached thereto chairs 91 at a pre-selected spacing. In these chairs 91, prestressing cable 71 is disposed so that an evenly spaced reinforcing prestressing construction for the pipe-liner 377 can be made. By using at least two of these elements 93 as reinforcing-spacing belts, parallel arrangements of spirally wound cable-forms are easily provided. If spirally wound cable-forms are not desired, the same elements 93 may be used to provide parallel spacing to the reinforcement 71. Additionally, the spacing belts and chairs therewith can be utilized to place cable-form reinforcement at a designed distance up from the surface of the pipe-liner 377 in carrying out certain specific structural engineering requirements by having the height of a particular chair used act as the spacing medium. Such chairs can be made out of relatively inexpensive plastic, e.g., polyethylene or vinyl chloride resins or may be stamped out of metal.

FIGURE 17 is an elevation of such an element 93 comprising a reinforcing-spacing belt. Made in linear lengths it can be cut to specific lengths and is connected by means of any useful type, e.g., rivets, or bolts as shown as element 92.

While known means of mechanically facilitating construction operation of the various components of this invention, devices such as thermostats, electrical switching, circuitry, and actuating devices for elements of the apparatus must be used, these are known in the art. Automation devices particularly in winding fibers in the various winds used, helical, linear, or circular winding are most useful. The holding of mandrels in position inside of a length of pipe-liner 377 then being processed is accomplished by proximity switches and electronic devices and magnetic elements operated from outside the molding means 241 or equivalent means. The fibrous reinforced polymeric resin composition can be selected that provides no interference to such operation, e.g., valve 2301 being operated by electronic device being shown at 2302 in FIGURE 14.

Stressing means for stressing fibrous or metal construction comprise mechanical means such as hydraulic jacks 910 known in the art of prestressed preloaded structures as well as devices of my own invention are used in inducing mechanically applied preload into cable-forms 71 through their end-loop-enlargements, as e.g., 171. Stressing means provided by heat generated during the polymerization reaction of polymeric resin compositions of this invention which is known as exothermic heat, as well as sensible heat applied to raise the temperature of the polymeric resin compositions to cause polymerization from ambient temperatures, also is a component part of this invention. Staging of the time of heat input as e.g., when the fibrous reinforcement embedded in polymerizable polymeric resin composition is wound as in my copending application Serial No. 391,987, filed August 25, 1964, or in my U.S. Patent No. 3,177,902, in an ambient temperature condition on the mandrel 236 or equivalent, and when said winding is completed heat is added to the inside of the mandrel with the mandrel being made of a metal having substantial expansion, as e.g., aluminum, the increase in size of the mandrel 236 by heat stresses the wound fiber, e.g., glass fiber rovings, or woven tapes, or strands, so that the polymerization reaction occurring in the polymeric resin composition then being used even of low shrinkage values causes the glass fiber to be set in place in a stressed condition as the resin composition sets and cures. Mandrels made with overlapping segments and having expansion means inside the mandrel *as shown in FIGURES 27 and 28, such mandrels* also provide stressing means of this invention. Glass fiber or in fact any other fiber used, or wire used, can have its structural engineering properties improved with prestressed preload calculated and provided in accordance with a pre-selected structural and chemical engineering concept of structure.

Concrete 1 in any of its materials engineering concepts of this invention can also, for specific embodiments, be prestressed preloaded by the same means as above given by taking into the process then being used a timed use of the features of polymerization reaction and a timed use of prestressing into the composite structure of prestressed preloads. Induction of prestressed preloads by heat, by mechanical means and by shrinkage forces are useful only when captured-in-place and the polymerization reaction resulting in conversion of fluid polymerizable materials is the means alone or in compatible combination with known means to provide the pipe composite materials structure of this invention.

In certain construction embodiments of this invention because of the restraint exercised by the end anchorage means against a bulkhead, e.g., element 907 and element 911, the cable form 171 enlargement being set in a slot which passes the cable-form 71 but not the enlargement 171 (said slot not being shown), through the said bulkheads, the force system provided by the shrinkage of the resinous material and/or the concrete 1 material of a particular embodiment then being made in a means whereby the pipe construction as composite structure is prestressed preloaded.

In "B"-stage resin systems the chemical engineer in a plant making up the prepared-ready-for-use-cable-form of FIGURE 11 or the belt-form of FIGURE 12, by formulation and quality control means insures under the proper environment in a chemical plant that the integrity and the uniformity of structural engineering usefulness of the reinforcing means of the instant invention is provided. In the method of Serial No. 391,987, filed August 25, 1964, quality control is provided for in the field use of apparatus of the invention.

FIGURE 18 shows an enlargement of one element 91 mounted on belt 92. Element 91 provides spacing means for prestressing cables 71. When cable-forms 71 are used in an arrangement that is substantially parallel to the main flow line of the pipe, belt-form shown in FIGURE 17 serves to maintain positioning of said cable forms 71. Alternatively, if the structural engineering of the prestressed preloaded pipe-line structure requires placement as in FIGURE 16, the belt-form of FIGURE 17 by means of element 91 holds the helically arranged cable-forms 71 at any pre-selected line of pitch. The embodiments shown are in some cases oversize and not to scale but no limitation is intended in size in showing the features of this invention.

FIGURE 19 is an enlarged sectional view of a pipe-liner 377 in various stages of processing. Generally mandrel 236 is shown inside of the pipe-liner 377 with the oven 241 surrounding the pipe-liner and mandrel 236. The mandrel 236 has a rounded front end which has an orifice 235 which is operated by apparatus inside of the mandrel 236 by means outside of the oven 241 comprising an electronic device similar to that shown in FIGURE 14 as element 2301. Additionally, ports 234a and 234b are operated by similar devices. Elements 257a and 257b represent magnetic holding plates as described supra, and are shown here in the surface of the mandrel 236. In this embodiment they have highly polished or chrome plated surfaces but when I place the device inside of the aluminum shell of a mandrel, these devices may be of ferromagnetic materials. The fluid or air hose 223 is shown in FIGURE 19 but alternatively, the mandrel of FIGURE 14 may be used. In this case hose 223 and air supply from compressor is not used but the mandrel of FIGURE 14 is used and it contains its own fluid or air supply sufficient for a pre-selected period of processing of pipe-liner 377.

As is shown in FIGURE 19, elements 243 and 244 represent pressure means components of the oven 241, the depression 277 and 278 in the pipe-liner 377 being exaggerated in depth in order to show by the drawing that this pressure means holds the mandrel in position during the processing. Platen 237 is heated by heating elements 281 and insulation material 239 retains the heat in the oven.

Element 310 represents means of providing polymerizable polymeric resin composition into the fibrous reinforcements of the invention. The apparatus is substantially circular in being around the tubular piper-liner 377. No limitation is intended upon any other configuration as elliptical or other shapes as tubes can be made. Element 304 represents means of applying bonding material 78 to the pipe-liner 377 surface for bonding to the concrete 1 at the interface of the pipe-liner and the concrete 1. Additionally, at 701 is shown a tank means which provides bonding material 79 which adheres to bonding material 78 and is sand or sand and Portland cement, or in fact any other selected material used to unite the pipe-liner 377 at its interface with concrete 1. Spray unit 303 is similar resin dispersing means as element 304. While spray type units are shown other means may be used, such as dipping, adhering or placing said bonding materials. In certain embodiments ribbed or otherwise provided bonding or holding means may be used and element 78 and element 79 omitted from the process, from all or only a portion of a composite concrete pipe construction of the invention.

Element 700 represents the concrete 1 dispensing means of the invention and is provided by known means or by improved concrete placement means of my invention. The elements 78 and 79 displace portions of the concrete 1 placed over them and at the interface make a composite material out of the concrete 1, the polymeric resin composition and the sand or sand and Portland cement 79. Water from concrete 1 sets the Portland cement which is applied dry. Earth 119 is a component of the construction because concrete 1 is placed thereon 119 in a wet condition and at the interface between the concrete 1 and the earth 119 particles of each comingle and provide a unitary structure. Care must be used in making the composite structure of the composite pipe of this invention. A soaked trench with earth 119 being in a "too-wet" condition could "rob" the concrete 1 of some of its Portland cement by capillary forces. Resorting to non-Portland cement binder, e.g., polymerizable polymeric resin compositions can solve such a problem.

FIGURE 20 shows a general view of the pipe-liner 377 as made on the trailer 306 and being deposited in the earth trench. Additionally, in this FIGURE 20 is shown means of prestressing a portion of said composite pipe line. Cable forms 71 are disposed in pre-selected spacing around the pipe-liner 377 and are stressed in prestressed preload by means of apparatus 907, and bulkhead for restraining cable-forms 71 by holding end-enlargements 171 by means, e.g., slots not shown, and apparatus elements 909, 910, and 911 which comprise prestressing means, element 909 being a bulkhead against which hydraulic jacks 910 bear with element 911 being the restraining bulkhead holding the prestressing apparatus in restraint. Cable-forms 71 are pre-tensioned to a pre-selected preload and this load is captured in place by concrete 1 when it sets. When the cable-forms 71 are placed in jacketed construction and are made of glass fiber unidirectional strands as shown in the drawings herein, these strands may be pre-tensioned in their dry state, or in their wet state having polymerizable polymeric resin around the said strands and about and into spaces between the strands. When the concrete 1 is poured about said strands the polymerization reaction may be actuated by means, e.g., slow acting catalysts activated by the heat of the reaction of the concrete 1 on setting, or any other means shown in my prior art or known in the art.

In the placing of pipe-liner 377 as shown on FIGURE 20, the nature of the degree of set or curing of the pipe-liner can be a feature in placement. When partially cured polymeric resin compositions as disclosed herein are used, the additional exterior coatings and bonding agents provided have an intimate bond in certain of the polymeric resins supplied and as e.g., partially cured epoxy-polyamine polymeric resin composition will readily bond with additional resins of similar properties which are applied at 78. Alternately, fully bonded and cured layers of a construction of pipe-liner 377 may have the layer next to the mandrel in fully cured condition while layer of layers thereof and thereover are in a partially cured condition so integration of structure will obtain in process.

Referring to FIGURE 21, this apparatus of the invention comprises a trailer or truck type vehicle for transporting the apparatus to the site of use and such trailer or truck type vehicle then travels and straddles or parallels a pre-dug trench and lays into the trench a predetermined and pre-selected sized and structurally designed tubular construction pipe-liner 377, and which in the manufacture of an irrigation pipe line, or an oil field pipe line, or e.g., a chemical process pipe line, comprises the pipe-liner product made on the apparatus of FIGURE 21. Such a pipe-liner in ready for use condition, or partially made ready for use condition can be supplied onto a reel-unit and utilized as in FIGURE 5. However, in a great many uses of this invention, the pipe-liner 377 can be made on the apparatus of FIGURE 21 or variations thereof, and supplied directly from the apparatus to the trench. In either portion of the process the pipe-liner is covered in the trench with concrete 1 and thus forms a composite concrete reinforced pipe-line, i.e., pipe-liner 377 may be provided by different means in subassembly of components or in full assembly of components so that the pipe-liner 377 is deposited in a trench and is covered with a protective cover as well as construction component comprised of concrete 1 as broadly defined herein. Element 90e represents a diesel-electric power source for heat and power.

In FIGURE 21, element 2367 represents a forming means mandrel which is shaped like a torpedo upon which e.g., polymerizable polymeric resinous material 21 is placed and in which embedded glass fibers 7 are wound at a pre-selected helical angle or otherwise determined "lay" of the fiber 7, e.g., circularly layed fibers 7 over a lay and cross lay of helical wound fibers, or e.g., longitudinally layed fibers under a lay of helical wound fibers followed by a lay of circularly layed fibers followed by a cross lay of helically layed fibers 7.

As a first element 9 comprising a release sheet or a thermoplastic polymeric resin composition component of a given structurally and chemically engineered construction, or other functional use, element 9 is wound or placed on the said mandrel 2367. This element 9 may be of thermoplastic material or of thermosetting material, or of a composite material, or may be comprised of polyethylene, or vinyl resins, or polyethylene terephthalate, etc., e.g., strips, or webs, or strands or pre-formed tubes of release material used for release alone or for release and a functional use. Such a functional use can be that of providing a resilient liner feature as e.g., using neoprene rubber, or butyl rubber, or chlorinated polyethylene, or polycarbonate, proprietary thermoplastics, or rubbers, as a first layer. Such layers may be supported on the mandrel by peel-off type layer of polyethylene film wound onto the aluminum in strip form and if desired, heat sealed connected strip to strip as wound around the mandrel. Such a first layer would insure air tight construction for inflating pipe-liner 377.

The mandrel 2367 is secured in a substantially built holding device 15 which is so designed that the mandrel element is maintained in cantilevered position fixed in place. In this embodiment the mandrel does not rotate. Adjacent to device 15 end frame 63 supports fixed in place creel holder 5 upon which rovings 7 are placed. These reels of roving 7 are so placed that the roving strands, e.g., glass fibers 7, are fed through polyethylene terephthalate, Teflon, or glass or porcelain fitted eyes 3 and then are placed over the release material, e.g. polyethylene element 9 and are drawn forward for linear reinforcing in this type of embodiment. Such reinforcing linearly placed is in addition to helical and/or circularly placed roving or other winding pattern.

The second stage of the manufacture on this apparatus starts at frame 62. On frame 62 there is mounted a revolving ring assembly 10 which is secured to frame 62 by holding ring 12 which has means for holding as well as means to enable ring assembly 10 to revolve on said holding ring 12.

Upon revolving ring 12 a plurality of spindle holders 14 are mounted. Upon these spindle holders 14 there are placed roving balls of glass fiber 7 or spools of synthetic fibers or of wire. In some cases different reinforcing materials will be placed alternately or otherwise on the spindle holders 14 so that a composite reinforcement and pipe-liner 377 structure will result and be built on the apparatus. Such composite reinforcement could be fibers unidirectional strands 60 end 150's Owens-Corning glass fibers roving and next to it on alternate spindle reels could be placed #30 stainless steel wire. Many composite structural reinforcements are thus available and no limitation is intended on the possible combinations. Structural engineers can and will design many kinds of composite structural embodiments.

Revolving ring 12 is driven at a pre-selected speed by motor 17 which drives shaft 68 which drives gear 16 which drives chain 10. Revolving ring 12 is arranged so that fibers 7 are helically or otherwise advanced on the release agent e.g., a proprietary release spray of silicone or wax or e.g., polyethylene film which covers the mandrel 2637. These fibers 7 are layed in one or more layers to build up the required structural cross-section of reinforcing material. A revolving ring 12 is mounted on frame 61 and feeds its roving fiber 7 lays back under spray guns 40 and 41 or may be pulled through an impregnating tank of resin composition while revolving ring 12 mounted on frame 62 feeds its roving fiber 7 lays forward onto the mandrel 2367. This makes a composite lay of a plurality of strands of roving fibers 7 as the polymeric resin composition 21 used for bonding and binding the fibers 7 one to the other is applied onto the lays of fibers 7 from spray guns 40 and 41 or by any other equivalent applying means. Thorough covering and embedding of the fibers is what is required and other applying means can be used, or the fibers can be pre-impregnated with all or a part of the particular resin compositions used.

Variations in sequence of laying fibers 7 can be made so that many particular and different reinforcement constructions can be made. The polymeric resin compositions such as unsaturated polyester resin compositions, or epoxy resin compositions, or polyurethane resin compositions or compatible combinations of polymeric resin compositions can be cured by ambient means, sunlight, or other heating means. Useful for this purpose are electrical radiant heating devices as made by Edwin J. Weigand and Company, Pittsburgh, Pa. The mandrel may be heated by hot air blown into the mandrel 2367. Aluminum metal mandrel is a good heat transfer means and the hot air blown into the mandrel heats the aluminum metal and this in turn transfers heat into the laminated layer 777 as it is placed on the mandrel and as it is drawn across the mandrel by means of rubber faced or other friction type material of the powered belts 31, which are powered by electric motor 30, and belt 33 powered by motor 32. Alternately, a single power source and shafts and belts or gears can also provide the driving means of such apparatus. If required, a plurality of take-off means can be provided. In place of winding element 9 onto the mandrel using element 9 to provide a release means for removing pipe-liner 377 from the mandrel a release means comprised of polytetrafluoroethylene, Teflon, can be applied to the mandrel surface as a reuseable release agent.

The mandrel 2367 is slightly tapered for a portion thereof near its outward end. Air pressure pumped into the finished product 777 either as a fully cured product or as a partially cured product as hereinbefore described, comprises means designed to assist the releasing of the pipe-liner 377 as it is moved into the trench or is removed in sections of desired length. A cushion of air aids also in prestressing. When the product is of a thin section and unable by itself to support the concrete 1 in its wet state as placed thereover pipe-liner 377, three to 10 lbs. of air pressure, but not limited thereto, is pumped in to the pipe-liner 377 and this air acts, under such pressure as support means for the concrete 1 component of this invention, and this while it lays in the trench. The ends of pipe-liner 377 are closed as in the embodiments shown herewith. End means of closure may be provided by end plugs having gasket and holding means known in the art. Alternatively, a sealed dome-like-end-plug can be formed on the pipe-liner 377 making it into a tank-like construction or a vessel. Part 55 in the outward end of the mandrel is sized and valved, if desired, to regulate the flow of air into pipe-liner 377. The air pressure or fluid is provided e.g., from an air compressor 50, or the like, through pipe into end port of mandrel 2367 and valves may be provided at the intake end to control this pressure.

Of importance in one embodiment of this invention, the pipe-liner 377 is made as a continuously advancing component of the structure of the composite concrete pipe of this invention. As the trench is dug by ditching means shown herein, the pipe-liner is placed directly into the trench from the making means, and in some embodiments, the pipe-liner 377 is covered and coated with bonding and binding agents as herein disclosed as 78 and 79 elements provided to strengthen and improve the structure at the interface between the piper-liner 377 and the concrete 1 components of this invention. When certain concrete 1 mix designs are made without the use of Portland cement, polymeric resin compositions are used and in this case the pipe-liner 377 and the concrete 1 become unitary structure. The apparatus of the FIGURE 21 can provide both constructions. No limitation and no restriction is intended in the end use products made herein.

FIGURE 22 shows a diagrammatic elevation view of frame 62 and the roving ring assembly 12 having fiber 7 reel holding means 14. Fibers 7 are shown being drawn from their spools through a poreclain or other material eye means 3, and from eyes 9 onto the mandrel 2367 so that lays of fiber 7 are built up to the required thickness to make pipe-liner 377. Additionally, when required by a design, longitudinal fibers 7 are advanced as the fibers 7 are spun helically, or otherwise onto mandrel 2367. Motor 16 drives shaft 68 by means of chain drive 17 over sprocket on said shaft 68. This is also shown in FIGURE 21 and shaft 68 and apparatus thereof is shown as driving revolving ring 10 on both frames 61 and 62.

On FIGURES 21 and 22 there is shown polymeric resin composition disposed in tanks 21 and from these tanks formulated polymeric resins, or rubbers, or elastomeric or rubbery compositions are drawn and placed by spray means illustrated by element 40 and 41. Alternative means known in the art may be used to dispense these materials. Also alternatively, but not shown, the fibers 7 may be drawn from and through a creel device which has in combination a filament wetting and impregnating means. This means can be provided to control the amount of polymeric resin composition, etc., used for binding the strands of fiber 7. Such fiber 7 may be unidirectional strands of glass fiber roving, or other material, and may be tensioned by the apparatus. Typical of such apparatus as components of this invention apparatus are "Kidde Creels," of the Walter Kidde Company, of Newark, N.J., or equivalent means. Such creels can simplify fiber handling can be equipped to deliver 200 ends of single or plural end yarn or rovings and also provide tension devices adapted to inducing pre-selected amounts of tension into fibers 7.

As is known in the art, controlled tension compensators can be used which compensators provide a highly controlled fiber filament laying means. The use of compensator provides accurately controlled tension on unrolling or drawing of glass fibers as woven roving tape or as unidirectional strands whether in a dry state or in a pre-impregnated state. Any useful fiber 7 can be controlled for "pay out" on an accurate basis method.

A servo system may be employed as a closed mechanical loop acting through roller arms which serve as the sensing element not shown but known in the art.

A braking system is provided which constantly adjusts itself by responding to the movement of the roller arms, which adjustment is transmitted back through a feedback cable. Filament winding of fibers 7 is provided with known device which has exceptionally good acceleration characteristics, due to time delay provided by the storage capacity of the roller arms of apparatus available but not shown. Sensing rollers may be used having a Teflon, polytetrafluoroethylene coating, sleeves, or hard anodic coating, or in stainless steel.

The apparatus enables any helix angle ranging from 0° to 90° to be selected and incorporated into an accurately controlled pattern. High winding pattern is governed by separate gear trains or train which may be engaged when required during fabrication. An angle of 54.75° winding in lay and cross-lay positions pitch will develop in the wound construction about equal hoop strength and longitudinal strength. Other angles of winding are known to provide specific features of structure.

With fibers 7, or as alternate materials for winding purposes there may be used tapes of various constructions and pre-selected widths, as e.g., woven glass fiber roving tapes, jute, cotton or burlap woven tapes, or wire and glass fiber tapes, in fact, any materials alone or in desired engineered combinations can be used as ready made tapes and placed by means of this invention.

FIGURE 23 shows an elevation of frame 63 looking toward the beginning end of mandrel holder 15. Mandrel holder 15 is a strong construction as shown supra adapted to support mandrel 2367 in a cantilevered position as shown in FIGURE 21. Holder 15 is shown having a circular opening of the size of the largest type of mandrel that the apparatus is designed to use. For example, if the largest size mandrel 2367 will provide a pipe-liner 377 of a 60-inch diameter and have a 2″ thick wall, the holder would have a dimension of 64″. From the dimension of 64″ of holder 15 any smaller sized mandrel 2367 may be used by means of supports 73 shown in FIGURE 23. These supports may be screw jacks, or hydraulic jacks, or air pressure devices, wedges, or other apparatus provided to hold rigid and in place the size mandrel then being used. The drawings are so drawn to in some instances "stretch-out" the apparent details and dimensions thereof, but it is contemplated that the apparatus can be substantially condensed making for more rigid and accurately working apparatus. The trailer or truck bed 72 is shown supporting frames of the apparatus as e.g., frame 63. Tires or other moving means, e.g., caterpillar tractor means, etc., is represented by element 75.

Tankage can be made on a continuous production basis and such construction cut to desired lengths at will and have end closures bonded in place, or the closures can be provided by other constructions and means. Concrete pipes can be made of other than circular shapes on this apparatus by changing the shape of the mandrel. Pile constructions can be made wherein the pipe-liner 377 becomes the reinforcing and protecting cover for concrete 1 solidly poured into the inside of the pipe-liner 377 and when fitted with a driving shoe such a construction provides a very strong construction support.

In this FIGURE 21, the apparatus can provide that the laminated pipe-liner 377 may be drawn across or from the mandrel 2367 by means of rubber faced or otherwise adapted friction inducing take-off belts such as belts 31 and 33. In place of individual motor drives these powered belts 31 and 33 can be powered by phase gear control takeoff from a single power source which would drive both rotating rings 10 and take-off belts 31 and 33, thus maintaining mechanical integrity throughout the fabricating cycle. This feature is particularly important because variations in helical angles can be readily made without having to synchronize elements of the apparatus. Belts 31 and 33 then automatically adjust to forming speeds and laying speeds of the fiber 7 placement.

The ease with which helically formed fibers are made on this apparatus also provides with another type of revolving ring apparatus the capability of making sleeve-type interwoven constructions from fiber contained on reels mounted on this revolving type of ring as shown in FIGURE 24. The revolving ring 12a contains grooves 8 and 8a in which unidirectional fiber strands 7 travel in opposite directions so these said fiber strands 7 are placed on the mandrel 2367 as woven sleeving 799. Such sleeving can be made to adjust in diameter because wet impregnated fibrous construction can be formed by pressure means. A construction may be made by the apparatus of this invention which includes expanding a pipe-liner 377 type of product or a specifically designed formed product that may be enlarged or formed against a containing die mold and by means, e.g., air pressure, made to the shape provided by the die or mold.

The mold or die may encircle the mandrel 2367 and be a circular shape as is required in making a venturi section of a pipe-line. The mold or die may be irregularly shaped to conform the wet impregnated fibrous construction contained e.g., in a sleeving type construction wound onto a pipe-liner 377 or (777) and provide a manhole element of a pipe-line, or make formed products of many types, e.g., tankage, storage vessels, car bodies, boats, military material, chemical vessels such as funnels, process vessels, etc.

The apparatus means of this invention and the methods used make for easy formability, variations of structure thickness as well as directional resistance type reinforcements (placing "muscle" strengths in the most advantageous location in a pipe-line structure). It has the ability to provide bonded and integrated reinforcements that are structurally designed component parts of structure. Fiber 7, e.g., unidirectional glass fiber rovings, glass fiber tapes, polyethylene terephthalate strands, nylon strands, butyl rubber bands, elastomeric rubbery fibers and bands, polyethylene fibers, polyethylene strip sheets, polypropylene fibers, strands and sheets, are used with epoxy resin bonding and binding resin compositions, unsaturated polyester resin compositions, urethane resin compositions, phenolic resin compositions, and in fact, any other polymeric resin composition to comprise a particular feature of structure of this invention or in which in combination with compatible materials provides particular features of this invention. Metal inserts, metal reinforcements, synthetic fibers and fillers, mineral fillers of many kinds can be incorporated in specific formulated polymeric resin compositions and are capable of being placed by the apparatus of this invention. Air compressor 50 and the holding tank 51 provide means of inflation of elements shown in FIGURE 24.

Payout device belts exampled by elements 31 and 33 may be additionally provided by guide contour shapes, e.g., a venturi section of a pipe-liner 377 can be frictionally moved from the mandrel or the mold or die upon which its shape depends and is made. No limitation is intended as to the shape of dies or molds within the capability of the removal of a product made on this apparatus. The machine apparatus is not limited to circular pipe-liner shapes but any reasonable shapes such as squares, triangles, elliptical, or depress elliptical, spheroid, paraboloid, conical shapes or combinations of shapes may be made in continuous process constructions by the machines of this invention.

The apparatus and methods of this invention can supply military pipelines manufactured in the field, or manufactured nearby and placed in the ground for protection by ditching and back-filling of dug earth. These pipe-lines may be used for supply lines of water, fuel, or other fluids. Protective cover to the pipe-liner 377 component of the invention can be provided by polymerizable polymeric resin compositions mixed with the dug earth from the trench as the concrete 1 component of this invention.

The apparatus and method of this invention is so used that each piece of apparatus is connected by design to the necessary maintenance of continuity of construction. The ditcher mounted on a tractor device first digs the ditch and in one embodiment of the invention, a cable attached to the ditcher and the pipe-liner 377 manufacturing apparatus mounted on a mobile platform of the nature of a trailer or truck is drawn forward as the tractor of the ditcher is advanced providing a dug ditch. The pipe-liner 377 manufacturing apparatus on its conveyance deposits pipe-liner 377 into said ditch. Attached to the pipe-liner 377 manufacturing apparatus is the concrete 1 placing machine and as the pipe-liner 377 is layed in the trench it is fed into the concrete 1 placing machine and/or the concrete machine advances over the pipe-liner 377 and centers it in the concrete placing machine entrance opening and then deposits concrete 1 under, about and over the pipe-liner 377 and completes the composite pipe-construction of this invention. Added features may be interposed as e.g., prestressing features as shown in FIGURE 20 or any other features disclosed herein.

Alternatively, the pipe laying operation may be carried on by digging the ditch and providing on the pipe-liner 377 apparatus selected lengths of pipe-liner 377 which e.g., may have a bell type end on one end and a spigot type end on the other end which lengths of pipe-liner are joined together on the moving pipe-liner supplying vehicle by bonding means exampled by quick setting polymerizable polymeric resin compositions or other joinery means and are then placed into the trench as a continuous pipe-liner 377 construction.

FIGURE 26 shows bell and spigot type pipe-liner which embodiment of the invention will be required for use with machines now making poured-in-place concrete pipelines, but not all machines. The mandrel is fitted with an integral shaped band 228 by which the bell portion is formed on the pipe-liner construction. As shown it is a part of the mandrel but alternatively, the band may be a part added to the mandrel 236 or 2367. The taper end of the mandrels 236 and 2367 provides the spigot portion merely by extending the winding over onto the sloping portion of the mandrel end for a reasonable distance, e.g., 4 inches or 6 inches, or whatever a structural design requires. The pipe-liner is described in FIGURE 25 or it can be any of the other constructions shown herein. Element 67 represents a polymerizable polymeric resin composition bonding adhesive used to connect the pipe-liner lengths together on the pipe-liner trailer or alternatively on the ground beside the trench or in the trench. Spigot 227 nests directly and easily into bell 228 and when bonded together the joinery is stronger than the pipe-liner itself.

In FIGURE 14 an additional element can be added to hold the pipe-liner in position in the oven or processing. Element 95t is a thin rod passed through from the outside of the oven 241 or equivalent means that pierces the pipe-liner 377 and holds it in position during the curing cycle in the oven 241. As the pipe-liner 377 leaves the oven 241 and passes through spray or applying means 302 to receive the bonding resin composition 78, the holes caused by the thin rod 95t is filled with said resin, and if necessary, a piece of fiber glass mat or equivalent is also placed over the hole. The system works as a continuous system with increments of the pipe-liner 377 being cured partially or being cured fully on the interior surface but partially on the exterior surface. When the pipe-liner 377 has an unsaturated polyester resin composition binder and the bonding resin composition 78 is an epoxy resin composition, the pipe-liner may be fully cured because excellent bond is had between the two polymeric resins. Other resin systems can also be so used as is known in the art. Variations in processing can be had and no limitation is intended.

The apparatus shown herein is provided with practical means of tension programming for developing maximum physical properties of the fiber glass or other fibers used in making the pipe-liner 377. Many systems of the prior art do not consider the values lost in handling the fiber from original package roving into its final end use. Three basic apparatus functions must be so designed that (1) tension, (2) impregnation, and (3) placement of guidance provide reproducibility every time the apparatus is worked. The fibers as e.g., glass fiber roving, must be delivered to the mandrel having uniform strength and under controlled tension. Variations in tension must be held to a minimum and the tension from roving to roving, or strand to strand, and from end to end must be substantially uniform with the overall amount of tension level being adjustable by proper devices, i.e., automatic devices.

Impregnation of fibers, e.g., glass fiber rovings may be done ahead of the on-site manufacture, or the fibers may be brought to the site already impregnated. The degree to which impregnation of fibers of pipe-liner 377 as delivered in reels for use as in FIGURE 5 may be none too full impregnation. Alternatively, additional polymeric resin composition or compositions 21 may be provided as in FIGURE 5 to dry pre-package and oriented and "built-up" fibers of the pipe-liner 377. In wet winding the roving or fibers must be substantially completely impregnated with resin as it passes through the fiber delivery system or means. Fiber by fiber must be layed down so there are no voids or holes and at the same time no excess of resin composition should remain on the roving fibers. The apparatus provides means to substantially hold the polymeric resin composition constant in percent of content and the apparatus is adjustable by known means to do this.

To speed up winding the individual rovings or fibers, e.g., glass fibers, apparatus may be used as is known in the art to collect the rovings or fibers into ribbons or tapes and winding a plurality of individual rovings or fibers onto the mandrel 2367 as in FIGURE 21. A wet winding system adapted to use on the apparatus of FIGURE 21 requires spool or holding means for roving spools, or yarn holder, a tensioning means device, an impregnation system and device, and a pay-out means device for the roving or fibers used. If the roving or glass fibers are already preimpregnated with polymeric resin and ready for use, a heating device will be used to heat the preimpregnated fibers or roving is used to liquify the polymeric resin composition from its "B"-stage condition just before the impregnated roving or fiber is layed onto the mandrel. A filament delivering system can be a numerically controlled filament winding machine which consists of spool holders, a tension and impregnation unit in combination, and a payout device, with the control resting in orifice controls and intermediate guides such as combs, rollers and pattern making controls. These several means are known in the art and in combination are used in making the products of this invention. In certain constructions, but not all, after impregnation is best means.

In FIGURE 25 is shown bell and spigot type of pipe-liner 377 that may be made on the apparatus of FIGURE 5 and FIGURE 19, and on FIGURE 21 herein shown. Pre-selected lengths of pipe-liner 377 are made as above described and in this embodiment element 97 comprises a bell portion of the pipe-liner 377 and element 227 comprises a spigot portion of the pipe-liner 377. The bell is made by spinning and winding additional fibers to form the bell 97. The spigot is made by extending the winding over the taper portion of the mandrel 2367 in FIGURE 21 while in FIGURE 5 the spigot portion is made on the taper portion of the mandrel 236 by increasing the pressure of the apparatus element 244 at 278 as shown in FIGURE 19. Simple cut-off means is employed. FIGURES 22 and 23 and 24 indicate features of apparatus showing spools and guiding means. The above features of manufacturing involved in tensioning, impregnating and placement or guidance of fibers are represented in these figures.

The pipe-liners 377 of this invention thus are provided in several structural and chemical engineered constructions. The important feature of having at least an outer portion of the said pipe-liner 377 in partially cured condition with respect to the polymerizable polymeric resin compositions used provides a most important contribution to pipe-liner structure in its combination with the composite structure provided with concrete 1 component. When commercial concrete made of Portland cement, sand and crushed rock aggregates are used, the interface structure and the pipe-liner structure are integrally bonded together by the "fingers" of bonding resin composition 78 and the mechanical and Portland cement bond to the sand and aggregates at the interface additionally provide strong bonded structure. Additionally, prestressing prestressed preloads provided by force systems captured from the polymerization reaction of the polymeric resin composition, and/or force systems provided by mechanical or thermal means as defined in my prior patents, are provided in on-site manufactured composite pipe lines. When concrete 1 is made of concrete aggregates bound together by non-cementitious cements such as polymerizable polymeric resin compositions, unitary structure is readily obtained. In preventing loss of fluid or water from these pipe-lines, the closing of concrete pores normal to concrete by the pipe-liner 377 system and by the use of impregnated structure of the concrete provides pipe improved structure and stops water waste.

*FIGURE 27 shows a mandrel known in the art having over-lapping segments 400 having elements 402 and 403 provided to form holding means to hold said over-lapping segments 400 to elements 409 freely to permit expansion limited by the characteristics of the materials of said elements when heat is induced into said mandrel body by elements 410, or by any other equivalent means. Said elements 409 are fastened to radial arms or equivalent means 404, which radial arms 404 or equivalent means are fastened to hollow shaft 407 having open space 408 wherein electrical circuits or other means are provided to induce expansion energy to means of heat 410. Prestressed preloads into the pipe-liner and pipe-line constructions are provided as internal stress induced by said mandrel having over-lapping segments 400. Other known art can be used to provide such prestressed preload constructions and this instant means makes for rapid manufacture because of the fine release capabilities of such mandrels.*

EXAMPLE I

Using the apparatus of FIGURE 5, FIGURE 6, FIGURE 7 and FIGURE 19 a continuous length of concrete composite pipe line is made as follows:

A preformed tubular construction comprising spirally wound reinforcement consisting of two helically applied lays of glass fiber 60 and 150's rovings layed at about 54.75° to opposite hands in lay and cross lay position and having a third layer of circularly wound glass fiber 60 end 150's rovings coated with a "B" stage epoxy resin composition is supplied in reel form and mounted upon the reel standard support. To protect the glass fiber a thin layer of polyethylene cover sheet is provided at the point of manufacture where the tubular construction 377 in its partially cured "B" stage state is manufactured. The pipe-liner 377 is fed through sizing rolls 372 and 376 and into the oven 241. As the pipe-liner 377 is made ready for passing through the oven, it is cut to a substantially true circle cut so that it may be fastened to bulkhead 215–216 as shown in FIGURE 7. The pipe-liner 377 in passing through the oven 241 is additionally cured, but not fully cured, and in this condition is able to be self-supporting. In this state it is pulled from the oven and down into the trench and into the concrete placing machine so it may be fastened onto the bulkhead 215–216. The mandrel 236 is placed inside of the tube pipe-liner 377 before the pipe-liner is fastened to the bulkhead 215–216, as is the air feed line 223. The pipe-liner 377 is cured to the desired stage of cure short of full cure in oven 241 as it passes through in increments equal to the length of the oven and is covered with bonding resin 78 as it leaves the oven 241 from resin applicator 302.

In entering the oven 241 in this example the fibrous construction of pipe-liner 377 has the designed amount of polymerizable polymeric resin composition in its packaged condition on the reel unit. Heat from the oven raises the temperature of this polymerizable polymeric resin composition 21 and cures it to that state of partially cured state designed to make the pipe-liner 377 self supporting but still adapted to take on the bonding resin composition 78 and have it become a component of structure on completion of the total curing of the finished product. The continuity of bonded structure at the interface structure of the pipe-liner 377 and the concrete cover 1 is structurally important in prestressed preloaded construction. Load transfer between components of the pipe-line structure used as high pressure pipe lines is best achieved when the materials components of the structure are in integral bonded structure. This is particularly important in the structures' capabilities in resisting dynamic loadings. It is also highly desirable in providing impervious wall structures in embodiments of the invention.

When reliance is placed upon mechanical bond between the pipe-liner 377 and the concrete 1 cover, constructions having ridges of various spacing requirements that are cable-like in construction but still a part of the winding of the fibers are found to be adequate. The ease with which additional fibers e.g. glass fibers unidirectional roving, are wound into the pipe-liner 377 construction, provides a low cost means of structural integrity. In the apparatus of FIGURES 5, 6, 7, and 19, the platen surface will be provided with matched configurations to accommodate the cable-like windings. This embodiment involves little additional work since the pipe-liner 377 in this case has the fibrous reinforcement wound as designed and provided on the reel-unit.

The bonding resin composition 78 as mentioned supra as being applied to the pipe-liner 377 at its leaving the oven 241 can and is further combined with Portland cement in its dry state mixed with sand 79 at the entrance of the pipe-liner 377 to the concrete placing machine. Here the wet concrete is vibrated and moved into place around and under and over the said pipe-liner 377. The polymeric resin composition still in its polymerizable state and the dry Portland cement and sand co-mingle with the wet concrete at the interface and a very strong bonded structure is obtained, i.e., when the whole composite materials cure and set.

The preimpregnated constructions adapted to packaged ready-for-use reel-unit constructions can be made out of unidirectional glass fibers, tapes or fabric constructions and the resin systems used generally are epoxy or polyester resin systems. In the case of epoxy resin compositions, aromatic diamines such as meta-phenylendiamine, diaminodiphenylmethane (both of which provide short shelf lives for the preimpregnated fibrous constructions package) or diaminophysulfone (which provides a longer shelf life) may be used as hardeners. Other hardeners may be anhydrides such as "Nadic" anhydride or pyromellitic dianhydride but these are hardeners requiring relatively long cures and unless modified with other hardeners systems slow up the process of pipe-liner manufacture. $BF_3$ monoethylamine complex provides flexible tacky pre-impregnated materials and are utilized in this example. In combination with diaminodiphenylsulfone $BF_3$ monoethylamine is a useful secondary curing agent.

Unsaturated polyester resin compositions are useful in making these preimpregnated fibrous constructions and a very substantial feature is derived from these resin systems. The shrinkage feature of the unsaturated polyester resins provide substantial induced prestressed preload and also provide low cost constructions. Both solvent drying systems and 100% solids resins which are heated in the process of impregnation to achieve working viscosities are known in the art. Reinforcement is dipped and doctor bladed or otherwise impregnated. Mixtures of DAP or other monomer vehicles to which are added pulverized resin solids may be used to make preimpregnated constructions. Fillers may also be added in formulated constructions. Dry pulverized polyester resin compositions, e.g., Atlac 382 unsaturated polyester resin composition plus appropriate curing catalyst and promoters are known in the art and are widely used. Very long pot lives are available in these particular systems.

Other resin systems include phenolic melamine and urea, silicone also find use either alone or in combination with unsaturated polyester resins and epoxy resin compositions. The structural engineering design in view of the chemical engineering involved governs specific structural embodiments.

Isophthalic based unsaturated polyesters and unsaturated polyesters made by using hydrogenated bisphenol A with maleic, fumaric, and phthalic acids and propylene glycol provide resin systems having high resistance to chemical attack.

EXAMPLE II

Using the apparatus of FIGURE 21 a partially cured ready-for-use pipe-liner 377 is manufactured on the said apparatus on-site wherein said apparatus is a component of a composite concrete pipe making and laying train of this invention. One embodiment of the invention is made as follows:

First a layer of mold release is applied to the cold mandrel, i.e., at ambient temperature, and next a plurality or forward moving strands of fiber, e.g., glass fiber unidirectional roving having a chrome size thereon are placed in position for spinning in a helical winding and then are wound at a selected helical angle, e.g., 54.75° from the horizontal which comprises the winding angle. It is known that in any given combination of helical systems of winding, the girth strength will be equal to the sum of the products of $\sin^2 \theta$ and the thickness of the windings at that angle, expressed as a fraction of the total wall thickness, times the hoop tensile strength of unidirectional windings for the material used. The same relationship holds for $\cos^2 \theta$ and the longitudinal strength. The elastic properties of a balanced cylindrical structure are such that strain is equal in all directions. These are the properties sought in this example.

While the strands of glass fiber roving are being spun onto the said mandrel, polymerizable polymeric resin composition as e.g., an isophthalic based unsaturated polyester resin composition having a catalyst as e.g., benzoyl peroxide based catalyst and [adaptel] *adapted* to curing at 250° F. is applied to the strands of fiber as they are layed upon the mandrel under a preselected tension, and this until the mandrel is covered for the desired length of mandrel.

Next with at least some of the forward moving strands of fiber layed onto said mandrel, start placing strands of glass fiber unidirectional roving in cross-lay position at an equal but opposite lay to the forward moving strands, i.e., an angle of 54.75° helical angle and spin and lay, in reverse moving lay said glass fiber strands, and cover substantially all of the first layed strands of said glass fiber roving, and while this is being done continue applying polymerizable polymeric resin composition, the said unsaturated isophthalic polyester resin composition and said catalyst therefor so as to cover the surface of all strands of fiber in a substantial manner.

At this stage of construction with a substantial amount of resin composition present to insure against pinholes, a product is now made ready for curing and is considered as the basic construction of a pipe-liner 377. As design requirements are met additional features can be incorporated. For this product all that remains to be done is to cure it to that stage of cure to make it self supporting and yet have the capability of having the bonding resin composition 78 placed on its exterior surface if this is required in a design.

To cure this embodiment of the invention heat is applied to the inside of the mandrel so that the aluminum cylinder comprising the mandrel is expanded by heat which cause the fibers to nestle and align themselves initially as the curing progresses. This should take only a few minutes, 2 to 4 minutes for certain known catalysts. This can take place while the spun glass fiber roving is in a fixed position to obtain this state of cure or it can be done while the spun glass fiber roving is moving across the mandrel in a preselected rate of forward movement, the movement in the first case being done after a desired state of cure is reached and the pipe-liner 377 moving forward in increments instead of continuously. The apparatus is adapted to provide either means by adjusting controlling means.

As the partially polymerized polymeric resin composition reaches the desired state of cure, the pipe-liner 377 is moved forward into the trench and is further covered with the bonding resin composition 78 if desired. As the pipe-liner 377 enters into the concrete placing machine it receives a covering of sand, or 79 Portland cement and sand in a dry state and adheres to the polymeric resin composition already in place. As the concrete is placed by vibration and gravity about the pipe-liner 377 in the concrete placing machine, the interface materials 78 and 79 commingle with the wet concrete and thoroughly bond the pipe-liner 377 to the concrete cover.

The composite polymeric resin composition-fiber reinforced concrete pipe construction thus is provided by a continuous on-site manufacturing operation. Time is a critical feature and each step must be done in accordance with a plan. For the pipe-liner 377 in this embodiment to reach a stage of cure for its polymeric resin compositions in and of the fibers ahead of schedule could affect the integrated structure desired in the combination of materials at the interface between the pipe-liner and the concrete 1 materials. The ditcher and tractor is the moving force for the whole train of apparatus and as the ditch is dug the apparatus on the pipe-liner carrying vehicle is set in motion and manufactures the pipe-liner 377 and places it into the trench where it is fed into the concrete 1 placing machine and covered and integrated to the said concrete 1. The composite pipe-line structure is thus made in a continuous process.

EXAMPLE III

In this example additional features are provided to the pipe-liner 377 wherein prestressed preloaded cable-form reinforcements are added for horizontal support as in FIGURE 20. With the pipe-liner in place in the trench and ready for the concrete cover 1, apparatus comprising elements 907, 909, 910, and 911 are placed in the trench about the pipe-liner 377. Bulkhead 907 comprises a heavy member consisting of two pieces of iron or other useful material that is bolted together around the pipe-liner 377. Bulkheads 909 and 911 are similar members and have supporting means for hydraulic jacks or jack by which the bulkhead 911 is pushed outward to lengthen the reinforcement cable 71 to the desired amount of prestressed preload. Different means can be used to hold the bulkheads in position, one being the use of the concrete 1 being applied around the pipe-liner 377 and the tensioning of the cable being done while the concrete 1 is in its uncured state, the dead load of the concrete being sufficient to hold the bulkheads in position.

Another means that can be used to hold the bulkheads in position is to use spreader bars (not shown) and remove them after the concrete is set. Still another means is to have the bulkheads attached to a heavy vehicle and place the vehicle over the trench and drop the bulkheads down from strong supports and leave the vehicle in place until the concrete sets.

Another means that can be used in this prestressing operation is to use cable-forms 71 having an impervious cover and capability of movement within the cover. In this case the concrete is poured around the pipe-liner and the cable-forms 71 and allowed to set. After the concrete 1 has set the prestressing of the prestressed preloads into the cable-forms is done and the end anchorage means utilized for the holding of the stresses induced, this being a post-tensioning means in this application.

In my prior Patents No. 2,671,158, No. 2,951,006, and No. 3,111,569 is shown embodiments of cable-forms useful in this example. Means to set the polymerizable polymeric resin compositions embedding and surrounding the fiber reinforcements of the cable-form are disclosed. These means can be slow setting catalysts or curing means as shown or can be resistance wires connected to a source of energy, e.g., a portable welder outfit, or an electrical distributing line which can provide energy on demand to raise the temperature of the said wires.

The heat of solidification of the concrete about the cable-form also aids in curing the polymeric resin composition. Alkali or acidic components of particular concretes (as broadly defined herein) can be the activators or catalysts for polymeric resin compositions brought into contact with them as in the construction of FIGURE 20, it being understood that the cable-forms just mentioned comprise fibrous reinforcements embedded in polymerizable polymeric resin compositions, e.g., epoxy resin such as Shell Chemical Co., #828 copolymerized with a polyamide resin such as Versamid 140, sold by General Mills, of Kankakee, Ill.

If the reinforcement is of steel prestressing cable, rod or bar, the mechanical means of the art is employed to prestress preload these reinforcements and the mechanical anchorages of the art or the resort to bonded reinforcements is employed. However, in certain constructions where bonded structure of a high order is required, the combination of e.g., Roebling's steel prestressing cable wrapped in unidirectional and multidirectional glass fiber and bonded with a high strength polymeric resin composition provide a bonded structure which under an A.S.T.M. Shear Test procedure showed 1567 lbs. per lineal inch of cable at a temperature of 250° F. wherein the test sample was heat soaked for 24 hours before the test and tested at 250° F. The Pacific Coast Uniform Code allows 24 lbs. per lineal inch shear value for steel bars bonded with Portland cement mortar, and this at ambient temperature of 72° F. The combination of features in inducing prestressed preload by mechanical means and chemical means provides high integrity structure because permeation of the concrete by the polymerizable polymeric resin compositions provide in place in the structure of the concrete itself strong "fingers" that are anchorages of bonded structure. Additionally, the shrinkage of the resin composition, e.g., an unsaturated polyester resin, when captured in the set resin, augments the force systems provided.

EXAMPLE IV

In this example the method of Example II and the product thereof is provided with additional features. Before the wound or spun glass fiber reinforcement comprised of two helical lays at opposite helical angles of 54.75° from the horizontal is cured, an additional circular lay of glass fiber roving is layed onto the mandrel so that roving by roving a full cover is applied over the helical lays underneath. The circular lay of glass fiber roving is substantially at right angle (90°) from the horizontal and compresses the helical lays and forces out air which sometimes is entrained in the prior lays. Additionally, its structural engineering function is provided in conformance with a design structural concept.

This construction can be used and be provided in the pipe-liner 377 as found in Example I. In either case the circular wrapped lay of glass fiber, or in fact any other designed use fiber or even wire, can be layed so as to provide other cable-form embodiments merely by concentrating the winding in a pattern and providing a plurality of glass fibers in particular spacing so that a corrugated or ridge like effect is obtained by the winding.

EXAMPLE V

The forming of a strong impervious concrete structure having features of rapid end use of the product or resistances directed to particular materials, alkalies, acids, or stress conditions is here disclosed. The pipe-liner of FIGURE 21 made as in Example IV is in this embodiment, lowered into the trench and has elements 78 and 79 placed on it as disclosed. The concrete applied as cover is made with a polymerizable polymeric resin composition in accordance with the following formula:

| | | |
|---|---|---|
| Unsaturated polyester resin (use an isophthalic resin such as Interchemical Corp., Clifton, N.J., "Chem-Stress" 770) | lbs | 35 |
| Styrene monomer | lbs | 7 |
| Methylethyl ketone peroxide | grams | 160 |
| Cobalt naphthenate (6%) | do | 15 |
| Chopped fiber glass—½" to 2" | do | 150 |
| $CaCO_3$ calcium carbonate—Snowflake for Whitaker, Clark & Daniels, New York, N.Y. | lbs | 85 |
| Silica sand and silica small aggregate ranging in blended mixture from 30 sand to ¼" particular sizes | lbs | 170 |

As is known in the art, temperature of ambient air, humidity, and environmental features affect the workability of polymeric resin compositions. The above formula is only a guide and in each environment test quantities should be made up and the formula varied slightly for workability. Any increase of benzoyl peroxide will decrease the pot life and also this applies to the accelerator cobalt naphthenate (6%).

The concrete placing machine must be cleaned promptly after each batch is placed. A thickness of the concrete mix will usually be less than one inch for many uses.

If the function of the pipe-line requires substantial resistance to radiological debris or chemically charged fluids of the nature, the addition of about 5% polyethylene resin in powder form and 95% lead powder by weight may be mixed into such a batch but concentrating the deposition of the polyethylene and lead in layer form to act as barrier material. An increase in the amount of "Chem-Stress"® 770 isophthalic unsaturated polyester resin composition sufficient to make the polyethylene and lead powders into a flowable mix is required and this will vary but approximates the quantities of resin already in the mix as an addition. Smaller quantities of polyethylene and lead powder should be placed at time because of the specific gravity of the lead. Additional amounts of fiber or glass fiber serve as supporting media in certain environments.

In certain embodiments of this example, it will be desired to further protect the pipe-liner 377 and the radiological barrier and this can be done on-site by having two concrete placing machines in tandem. The first machine dispenses the polymeric resin composition bound concrete and the second dispenses the Portland cement bound concrete or other material bound concrete. A length of trench is dug and the second machine lays a layer of Portland cement concrete on the bottom of the trench. It is then pulled back and the polymeric resin composition bound concrete is supplied by the first machine and is followed by the second concrete placing machine to cover the pipe-liner and radiological barrier. Other means can be used to time or place these materials and no means is limited because of the nature of the many polymeric resin compositions available. Extrusion of polyethylene or polypropylene resin pipe liners, or polyvinyl chloride resin pipe-liners 377, or as components of multi-polymeric resin compositions structures or laminated layers thereof, are used in the required different types of structures this invention provides. The fibers useful in certain embodiments of this example include glass fibers, quartz fibers and ceramic fibers. The resin compositions can be selected from the group of thermosetting resin compositions consisting of unsaturated polyesters, epoxy, and polyurethane resins, and these may be used alone or in combination as is known from much prior art I have disclosed.

Particular projects will require both thermosetting and thermoplastic polymeric resin compositions such as providing an inner layer such as element 121 being made of butyl rubber, or neoprene rubber, or elastomeric based rubber, polyethylene, polypropylene polycarbonate, or the other thermoplastic resins now available and additionally coming into the market. The structural engineering load bearing structure can include reinforcements made of glass fiber, steel, stainless steel, aluminum, beryllium, titanium and even exotic metal. Multifunction reinforcements can thus be provided.

Where functions of designed structure of the invention require it, the use of fibers selected from the group consisting of glass, jute, and cotton, ramie, bamboo, can be used alone or in combination with glass fibers, but not limited thereto.

Pipe-liner 377 as shown in FIGURES 5, 6, 7, can have additional means of reinforcement provided by constructions shown in FIGURES 15 and 16. In the processed pipe-liner 377 package in ready for use state, the addition of cable-forms 71 having end anchorages as shown can be packaged in the package. Orientation of cable-form 71 is accomplished by the construction of FIGURE 17 and FIGURE 18. In FIGURE 21 apparatus the cable-form 71 can be made right on the pipe-liner 377 by this apparatus or it can be added thereto after the initial construction of the pipe-liner of the invention is in the trench.

EXAMPLE VI

Field conditions of terrain or rough country or other reasons will require modifications of the instant invention by making it practical to manufacture the pipe-liner 377 in ready-for use states in lengths from say 4 feet long to say 30 feet long but not limited thereto. These lengths can be made in bell and spigot type as shown in FIGURE 25. If made off site they can be joined together by adhesive bonding on a trailer rig placed inbetween the ditcher and the concrete 1 placing machine. The process is similar in all respects except that the pipe-liner 377 is fabricated into long lengths ahead of the concrete placing machine. In all of the examples cited the pipe-liners 377 have been self-supporting in the trench.

EXAMPLE VII

This example is directed to installations wherein the pipe-liner 377 is of thin cross section and is not able to support the load of the wet concrete 1 cover as it is loaded and placed onto the pipe-liner 377.

As shown in FIGURES 1, 2, 3, 4, 5, 7, 19, and 12 extensive apparatus is provided to inflate the pipe-liner 377 with e.g., 3 to 10 lbs. of fluid or air pressure which amount of pressure generally is sufficient to support the dead load of the concrete 1 as placed over, under and around the said pipe-liner 377. In FIGURE 21 compressor 50 and air tank 51 provide air pressure for multipurpose uses in the processing of the said pipe-liner 377. Reinforcement 777 is aided in being removed in forward motion from the mandrel 2367 by air pressure released from orifice 55 of said mandrel 2367. The air cushion provides aids for forward movement of the pipe-liner 377 in its being moved by the friction type, or other known types of belts 31 and 33. Additionally the air is held in the inside of the pipe-liner 377 and when provided in from 3 to 10 lbs. pressure is used as support to hold the concrete 1 until the concrete 1 sets. The apparatus of FIGURE 7 illustrates means for closure in the forward end of the construction and FIGURE 21 shows the means provided as end closure to pipe-liner mandrel 2367.

The air supply tube 223 shown in FIGURE 7 and in FIGURE 19 unreels as the trailer unit moves forward. Alternatively, when a mandrel like that of FIGURE 14 is used no tube 223 is needed because the mandrel is also an air tank and holds enough air supply to provide for a given pre-selected length of construction of the composite pipe of this invention.

Alternatively, lengths of pipe-liner as shown in FIGURE 3 can be joined together and inflated in lengths preselected for portions of, or full length pipe-liner structures.

The polymeric resin compositions useful in this invention are many and the following formulations are examples thereof but by no means are these examples considered as limiting the formulations used:

No. 1

| | Parts by weight |
|---|---|
| Epoxy resin—Shell Development Co. No. 826 | 100 |
| Polyamide resin—General Mills Co. Versamid 140 | 50 |
| D.M.P. 30—Thiokol Corp. | 5 |

No. 2

| | |
|---|---|
| Epoxy-acrylic resin—(Epocryl E-11) Shell Development Co. | 100 |
| Styrene-monomer | 10 |
| Dimethylaniline | 0.05 |

(Depending upon the cure cycle this material can be at concentrations from 0.01 to 0.5% by weight of the resin.)

No. 3

| | |
|---|---|
| Benzoyl peroxide | 1.0 |
| Cab-O-Sil, finely divided silica | 1.0 |

(Depending upon temperature of ambient air and humidity this can be more or less until right working viscosity is obtained.)

No. 4

Glass fiber roving—20 end treated with any of these treatments, Nolan, Garan, A-172 and Z-6030 which are methacrylato, triethoxysilpropylamine, vinyl triethoxysilane, vinyl tris-2-methoxysilane, and y-methacryloxpropyltrimethoxysilane (4).

No. 5

| | |
|---|---|
| Interchemical Co. unsaturated polyester resin Chem-Stress® No. 770 (an isophthalic unsaturated polyester resin) | 100 |
| Methylethyl ketone peroxide, D.D.M. | 1 |
| Cobalt naphthenate (6%) | 0.2 |
| Styrene-monomer | 5.0 |

No. 6

| | |
|---|---|
| Bu-Tuf XB-303, Petrox-Tex Chemical Corp., polymerized butylenes as made at Houston, Tex. | 100 |

(Used only in uses where no hydrocarbons or chlorinated solvents are found. Used as heat melts and as components of pipe-liner systems. Joints made with said solvents.)

No. 7

High-molecular weight rigid PVC, polyvinyl chloride as defined in ASTM-D-1784060T pipe materials for use as components of pipe-liner systems.

My prior patents show other useful polymeric resin compositions which are used alone or in compatible combinations of structure as herein disclosed.

The polymerizable polymeric resin composition 78 plays an important part in obtaining the bonded structure desired in some of the embodiments of this invention. Placement of polymerizable polymeric resin composition 78, e.g., Shell Chemical Company No. 828 having a copolymerizable curing agent comprising General Mills Company, Versamid 140 as a basic mix which can be modified with a known diluent or modifier is obtained by the addition of thickening materials such as Cabot's Cab-O-Sil, a finely divided silica or other thixotropic forming materials. It is known how to place resinous materials on vertical or near vertical surfaces without having runoff. Adhesive materials are many and are what their name implies—adhesive. Dry sand or dry sand and Portland cement powders or in fact other bonding mediums adhere to these adhesives and in combination with the pressure exerted by the concrete 1 at the interface between the concrete 1 and the pipe-liner 377 provide the "fingers" extending into the set concrete 1 when the whole structure is cured and set.

In one embodiment the air used for supporting the pipe-liner 377 in addition to its own supporting strengths was increased after the concrete 1 had been placed but not very far along in curing. From a pressure of about 3 lbs. the air pressure was raised to 20 lbs. This induced a prestressed preload into the pipe-liner reinforcement and the concrete 1 which was captured in place when the composite materials of the structure of the pipe-line had fully cured. Additionally, the fingers of resin were driven farther up into the matrix of the concrete 1 and when set provided very secure anchorages at the interface between the pipe-liner and the concrete 1. When the whole composite structure was cured, the said pressure was released and a prestressed preloaded structure pipe line resulted. It must be kept in mind that because of layers of material being used it is possible to have the innermost layer fully cured while exterior layers are not fully cured and can be bonded to additional layers such as the interface between the pipe-liner 377 and the concrete 1 and to the concrete 1 itself.

The terms of description and expressions used which I have employed are used as terms of teaching description and not of limitation, and I have not intended nor have the intention in the use of such terms and expressions, of excluding any equivalents of the features shown and described or portions thereof, but recognize that various modifications are possible within the scope of the invention claimed. The broad definition of "concrete" herein is stressed.

I claim:

1. The method of making a composite material concrete pipe-liner on site in a suitable earth's environment therefor comprising providing a tubular pipe-liner construction which first acts as a forming means for said composite material concrete pipe-line, and second, with which said pipe-liner is integrated and covered by porous structural material exampled by concrete to make said pipe-line, said method comprising:

Step (1), provide a suitable earth's environment for making said pipe-line such as a ditch or other place of use and provide a pipe-liner processing trailer rig and provide a concrete placing machine following said pipe-liner processing trailer rig;

Step (2), move said pipe-liner processing trailer rig into position in said suitable environment for making said pipe-line and simultaneously actuate the apparatus to provide said pipe-liner and to move said pipe-liner processing rig forwardly to dispense said made pipe-liner into said suitable environment, said processing on said apparatus comprising applying a layer of mold release material on the surface of a mandrel and, second, place fiber reinforcing material in position on said mandrel, and while placing the fiber reinforcing materials onto said mandrel, apply polymerizable polymeric resin composition to cover said surface of said mandrel and at least embed said fiber reinforcement as it is being placed onto the said mandrel;

Step (3), while said placing of said fiber reinforcement is being done, heat the mandrel to at least partially cure said polymerizable polymeric resin composition and form a bonded and integrated pipe-liner structure when cured in place with a poured-in-place concrete component;

Step (4), with said pipe-liner at least partially cured, apply to the exterior surface thereof a layer of bonding resin composition having a curing agent therefor and in a thixotropic non-flowable adhesive state after being applied to said pipe-liner;

Step (5), move said pipe-liner into said suitable environment for making said pipe-line and insert it through the concrete placing machine in-feed apparatus and fasten the free end of said pipe-liner to a bulkhead while at the same time covering said pipe-liner as it enters said concrete placing machine with a layer of bonding minerals and apply said minerals into and onto said layer of adhesive bonding resin composition and make an interface structure layer thereby;

Step (6), while said pipe-liner processing trailer rig moves forwardly in said earth's environment and after said pipe-liner is inserted into said concrete placing machine, apply and cover over, under and about said pipe-liner and its interface structure layer of bonding minerals and adhesive bonding resin composition a concrete component comprising a fluid concrete flowable mix, and as the concrete placing machine advances over said pipe-liner, finish the upper surface of said composite material concrete pipe-line by using the apparatus of said concrete placing machine while said concrete pipe-line is supported by said earth's environment, and with subsequent curing of said pipe-line to ready it for use.

2. The method of making a composite material concrete pipe-line on-site in claim 1, wherein in addition, additional air is pumped into said pipe-liner to inflate it after it leaves the said apparatus of said processing trailer. to an inside pressure adequate to support itself and the super-imposed load derived from said concrete cover component, said air being retained under said pressure until said polymeric resin composition and said concrete cover is fully cured.

3. The method of making a composite material concrete pipe-line on site as in claim 1, wherein the said fiber reinforcement is tightly wound on said mandrel at ambient temperature, said fiber reinforcement being tensioned in prestressed preload before starting the curing of said polymerizable polymeric resin composition then embedding said fibers; said prestressed preload provided by heating the wall of the said mandrel and causing it to expand, whereby said heat cures said polymerizable polymeric resin composition while at the same time said heat provides the energy and stressing means to induce said tension prestressed preload into said fiber reinforcement, said heat being removed when said polymeric resin composition is cured at least to a partially cured state; said pipe-liner on return to ambient temperature from said curing temperature then being in ready-for-use state and easy to remove from said mandel and ready for further processing into said composite material concrete pipe-line.

4. The method of making a composite material concrete pipe-line on-site as in claim 1, wherein said mandrel is made of a metal selected from the group consisting of aluminum, magnesum, steel, stainless steel, chrome-plated steel, and combinations thereof.

[5. The method of making a composite material concrete pipe-line on-site as in claim 1, wherein additional longitudinal stands of fiber are placed substantially equidistant from each other around the circumference of said mandrel thereby providing linear reinforcement to said pipe-liner structure and said composite concrete pipe-line.]

6. The method of making a composite material concrete pipe-line on-site as in claim 1, wherein said polymerizable polymeric resin composition has a curing agent adapted to partially curing said polymeric resin composition while said pipe-liner is on said mandrel and after leaving said mandrel and upon the application of said bonding resin composition which contains an ambient setting curing agent, said partially cured polymeric resin composition together with said bonding agent resin composition cures to a final state of cure when the concrete component is applied, said heat of curing of said concrete acting as an assisting agent to complete said cure of said polymeric resins.

7. The method of making a composite material concrete pipe-line on-site as in claim 1, in which said concrete flowable mix comprises earth selected from a trench as dug in said earth's environment and mixed on site with selected polymerizable polymeric resin composition thereby providing said concrete component applied about, over and under said pipe-liner placed in said trench.

8. The method of making a composite material concrete pipe-line on site as in claim 1, in which upon completion of said processing and supplying of said pipe-liner as it leaves the mandrel, pump air through the mandrel to act as a cushion between said mandrel and said pipe-liner to aid in removing said pipe-liner from said mandrel and further processing the same.

[9. The method of making a composite material concrete pipe-line as in claim 8, in which in addition, linear reinforcements are secured in selectively spaced holding chairs, said holding chairs being mounted on a belt-form spaced chair holding means disposed around said pipe-liner and connected to said pipe-liner on top of said bonding resin composition, said holding chairs and belt-form spaced chair holding means providing substantially uniform spacing of said linear reinforcements in selected parallelism.]

10. The method of making a composite material concrete pipe-line on-site as in claim 1, wherein said pipe-liner is made on said mandrel having circular windings very close together covering helical windings whereby said circular windings of fiber force out entrained [aid] *air* and makes a substantially void free structure of said pipe-liner.

11. The method of making a composite material concrete pipe-line on-site as in claim 10, wherein at spaced intervals additional windings of fiber are wound under tension onto said mandrel to make said surface of said pipe-liner have a corrugated effect and providing increased strength by said windings comprising cable-like effect structure.

[12. The method of making a composite material concrete pipe-line on-site as in clam 1, wherein said polymerizable polymeric resin composition comprises a polymeric resin selected from the group of polymeric resins consisting of epoxy, polyamide, epoxy-acrylic resin having a styrene-monomer component and a dimethylaniline agent, benzoyl peroxide, and finely divided silica, an unsaturated isophthalic polyester resin, polymerized butylenes, and high molecular weight rigid polyvinyl chloride resin, and butyl rubber resin.]

13. The method of making a composite material concrete pipe-line on-site as in claim 12, wherein said concrete component at least in part comprises a concrete mixture having a polymeric resin binder.

*14. The method of making a continuous composite structural material pipe-line on site which begins on a mandrel and extends from the mandrel into a trench comprising providing a tubular pipe-liner construction which first acts as a forming means for said composite material structural pipe-line, and, second, with which said pipe-liner is integrated and covered with structural material exampled by concrete to make said pipe-line, said method comprising:*

*Step (1) apply and form a first layer comprising a continuous layer of fibrous reinforcing material in position about a mandrel, and while applying and forming the fibrous materials onto said mandrel, apply polymerizable polymeric resin composition to cover said surface of said mandrel and at least embed said fibrous reinforcement as it is being placed onto the said mandrel;*

*Step (2) at least partially cure said polymerizable polymeric resin composition and form a bonded and integrated pipe-liner structure;*

*Step (3) with said pipe-liner at least partially cured apply a second layer comprising a bonding composition onto said pipe-liner structure;*

*Step (4) place said pipe-liner into said trench;*

*Step (5) form a third layer of a flowable mix of structural material over, under, and about said pipe-*

*liner and fill the space between the said pipe-liner and the said trench walls; and*

*Step (6) cure any of said materials that are placed in an uncured state.*

*15. The method of making a continuous composite structural material pipe-line on-site which begins on a mandrel and extends into a trench as in claim 14 in which said pipe-liner is extended from said mandrel into said trench, and said pipe-liner is closed off, and in addition air is pumped into said pipe liner to inflate it to an inside pressure adequate to support itself and the superimposed load derived from said concrete cover component, said air being retained under said pressure until said polymeric resin composition and said structural material cover is set.*

*16. The method of making a continuous composite structural material pipe-line on-site which begins on a mandrel and extends into a trench as in claim 14, wherein the said fiber reinforcement is tightly wound on said mandrel at ambient temperature, said fiber reinforcement being tensioned in prestressed preload before starting the curing of said polymerizable polymeric resin composition then embedding said fibers; said prestressed preload provided by heating the wall of the said mandrel and causing it to expand, whereby said heat sets said polymerizable polymeric resin composition while at the same time said heat provides the energy and stressing means to induce said tension prestressed preload into said fiber reinforcement, said heat being removed when said polymeric resin composition is set at least to a partially set state; said pipe-liner on return to ambient temperature from said setting temperature then being in ready-for-use state and easy to remove from said mandrel and ready for further processing.*

*17. The method of making a continuous composite structural material pipe-line on-site which begins on a mandrel and extends into a trench as in claim 14, wherein additional longitudinal strands of fiber are placed around the circumference of said mandrel thereby providing linear reinforcement to said pipe-liner structure.*

*18. The method of making a continuous composite structural material pipe-line on-site which begins on a mandrel and extends into a trench as in claim 14, wherein said polymerizable polymeric resin composition has a curing agent adapted to partially curing said polymeric resin composition while said pipe-liner is on said mandrel and after leaving said mandrel and upon the application of said bonding resin composition which contains an ambient setting curing agent, said partially cured polymeric resin composition together with said bonding agent resin composition cures to a final state of cure when the said structural material component is applied, said heat of curing of said structural material acting as an assisting agent to complete said cure of said polymeric resins.*

*19. The method of making a continuous composite structural material pipe-line on-site which begins on a mandrel and extends into a trench as in claim 14, in which upon completion of said processing and supplying of said pipe-liner as it leaves the mandrel and said pipe-liner is extended into said trench, pump air through the mandrel to act as a cushion between said mandrel and said pipe-liner to aid in removing said pipe-liner from said mandrel and further processing the same.*

*20. The method of making a continuous composite structural material pipe-line on-site which begins on a mandrel and extends into a trench as in claim 14, wherein said pipe-liner is made on said mandrel having circular windings very close together covering helical windings whereby said circular windings of fiber force out entrained air and makes a substantially void free structure of said pipe-liner.*

*21. The method of making a continuous composite structural material pipe-liner on-site which begins on a mandrel and extends into a trench as in claim 14, wherein at spaced intervals additional windings of fiber are wound under tension onto said mandrel to make said surface of said pipe-liner have a corrugated effect and providing increased strength by said windings comprising cable-like effect structure.*

*22. The method of making a continuous composite structural material pipe-line on-site which begins on a mandrel and extends into a trench as in claim 15, wherein said structural material component at least in part comprises a structural material flowable mixture having a polymerizable polymeric resin binder, said structural material flowable mixture having the capability of providing a high strength bond to said material of said trench walls.*

*23. The method of making a continuous composite structural material fibrous reinforced ipe-line on-site which begins on a mandrel and extends on-site in a suitable earth's environment therefore comprising:*

*Step (1) provide a tubular polymeric resin composition fibrous reinforced pipe-liner construction wherein said pipe-liner is formed on a mandrel by forming a first layer comprising a continuous layer of fibrous reinforcing material exampled by glass fibers by integrating and embedding said fibrous reinforcing material in polymerizable polymeric resin composition on said mandrel;*

*Step (2) form a second layer of structural material comprising at least one aggregate particle filler material on the and to the surface of said polymerizable polymeric resin composition and form a selected thickness layer of said structural material on said surface;*

*Step (3) form a third layer comprising fibrous reinforcing material to the surface of said aggregate particle filler material by integrating and embedding said fibrous reinforcing material in additional polymerizable polymeric resin composition on said mandrel;*

*Step (4) form a selected number of alternate layers of said structural material comprising at least one aggregate particle filler material and said fibrous reinforcing material and integrate and embed the same in additional polymerizable polymeric resin composition;*

*Step (5) at least partially cure to at least a partially cured state said layers of said fibrous reinforcing material and said structural material comprising said at least one aggregate particle filler material integrated and embedded in said polymeric resin composition; and*

*Step (6) move said composite fibrous reinforced aggregate particle filler pipe wall body relative to said mandrel to extend said pipe wall body from said mandrel and place said pipe wall body on site in said suitable earth's environment.*

*24. The method of making a continuous composite structural material pipe-line on-site as in claim 23 in which any of said structural materials that are placed in an uncured state are then cured.*

*25. The method of making a continuous composite structural material fibrous reinforced pipe-line on-site which begins on a mandrel and extends on-site in a suitable earth's environment as in claim 23, in which in addition cast-in-place a layer of structural material about, around, over and under said pipe wall body on-site in a suitable earth's environment.*

*26. The method of making a continuous composite structural material fibrous reinforced pipe-line on-site which begins on a mandrel and extends on-site in a suitable earth's environment as in claim 23 in which sand is a selected filler, said sand being applied dry over said fibrous reinforcing layers in a surplus of said polymerizable polymeric resin composition over that needed to cover and embed said fibrous reinforcing on said mandrel and forming thereby said alternate layers of said structural*

*material comprising said aggregate particle filler material.*

*27. The method of making a continuous composite structural material fibrous reinforced pipe-line which begins on a mandrel and extends on-site in a suitable earth's environment as in claim 23, in which said fibrous reinforcing material comprises glass fiber strands applied in a continuous winding at a selected angle of wind.*

*28. The method of making a continuous composite structural material pipe-line on-site as in claim 14, in which apply a dry filler material to said polymerizable polymeric resin composition as said fibrous reinforcing is applied on said mandrel and make thereby laminated layers of said fibrous reinforcing material embedded and covered with said polymerizable polymeric resin composition having a dry filler material embedded and covered with said polymerizable polymeric resin composition over said fibrous reinforcing material.*

*29. The method of making a continuous composite structural material pipe-line on-site as in claim 14, in which apply and form said pipe-line by the additional steps of:*

*Step (1) formulate said polymerizable polymeric resin composition comprising an unsaturated polyester resin composition having at least one finely divided filler therein; and*

*Step (2) cover and embed said fibrous reinforcing material with said unsaturated polyester resin composition having at least one finely divided filler therein, and apply the combination of said fibrous reinforcing material and said unsaturated polyester resin composition having at least one finely divided filler therein to said mandrel.*

*30. The method of making a continuous composite structural material pipe-line on-site as in claim 14, in which in addition provide said pipe-liner in selected lengths having bell and spigot joints and join said lengths together by sealing elements, thereby providing said pipe-line with a means of joinery.*

*31. The method of making a continuous composite structural material pipe-line as in claim 23, in which in addition provide said pipe-liner with a bonding means to bond said pipe-liner and said structural material.*

*32. The method of making a continuous composite structural material pipe-line as in claim 23, in which said pipe-liner comprises an inner layer of gel coat of unsaturated polyester resin composition, a catalyst, glass fiber reinforcements embedded in a polymeric resin composition over said gel coat layer, and a bonding layer comprising a selected polymeric resin composition.*

*33. The method of making a continuous composite structural material pipe-line on-site which begins on a mandrel and extends into a trench as in claim 14, in which said polymerizable polymeric resin composition has a selected shrinkage capability and said shrinkage provides at least one force system as a component of structure of said pipe-line when said polymerizable polymeric resin composition is set and cured and which said force system provides prestressed preload forces in said continuous composite structural material pipe-line.*

*34. The method of making a continuous composite structural material pipe-line on-site which begins on a mandrel and extends into a trench as in claim 14, in which in addition induce and capture mechanically induced prestressed preload forces as components of structure into said pipe-line, said mechanically induced prestressed preloads are provided by the following steps:*

*Step (1), provide said mandrel as an expandable mandrel made with over-lapping segments and having expansion means inside of said mandrel;*

*Step (2), when said pipe-liner is formed on said mandrel and winding of said fibrous reinforcing is completed for that portion of said pipe-liner then on said mandrel, actuate the said expansion means of said expandable mandrel and move said over-lapping segments to enlarge the diameter of said mandrel thereby expanding said mandrel and thereby inducing mechanically induced prestressed preload forces into the said pipe-liner as said prestressed preload components of forces, of said structure of said pipe-liner.*

*35. The method of making a continuous composite structural material pipe-line on-site which begins on a mandrel and extends into a trench as in claim 14, in which in addition induce and capture mechanically induced prestressed preloads forces as components of structure into said pipe-line, said mechanically induced prestressed preloads forces provided by the following steps:*

*Step (1), provide cable-form fibrous reinforcing materials having end-loop-enlargements and apply and form said end-loop-enlargements into a holding means operated in connection with at least one hydraulic prestressing means;*

*Step (2), actuate said hydraulic prestressing means to induce a selected amount of tensile forces through said end-loop-enlargement of said cable-form fibrous reinforcing material into said cable-form fibrous reinforcing material and hold said cable-form fibrous reinforcing material in a state of prestressed preload;*

*Step (3), cover said fibrous reinforcing material with polymerizable polymeric resin composition and embed said fibrous reinforcing material with said polymerizable polymeric resin composition, and set said polymerizable polymeric resin composition to at least a partially cured state thereby capturing said prestressed preloads forces as a component of struc- of said pipe-line.*

*36. The method of making a continuous composite structural material pipe-line on-site which begins on a heat-expandable mandrel and extends into a trench as in claim 14, in which in addition induce and capture thermally induced prestressed preloads forces as components of structure into said pipe-line, said thermally induced prestressed preloads forces provided by the following steps:*

*Step (1), provide said mandrel as an expandable mandrel having heating elements disposed on the inside of said mandrel;*

*Step (2), when the applying and forming of said fibrous reinforcing is completed for that portion of said pipe-liner then on said mandrel, actuate the said heating elements disposed on the inside of said mandrel and thermally expand the said mandrel to a selected amount; at the same time initiate at least partial-curing of said polymerizable polymeric resin composition by means contained in said polymerizable polymeric resin composition, said curing means comprising a component substance of said polymerizable polymeric resin composition having the property and capability of causing said polymerizable polymeric resin composition to at least partially cure with the application of selected amounts of heat.*

*37. The method of making a continuous composite structural material pipe-line on-site which begins on a reel-unit and is placed in an oven and extends on-site in a suitable earth's environment comprising:*

*Step (1), provide an at least partially fabricated fibrous reinforcing material pipe-liner component on a reel-unit and move said preformed pipe-liner material into said oven having means for forming said preformed at least partially fabricated fibrous reinforcing material pipe-liner component into an at least partially completed pipe-liner construction;*

*Step (2), induce fluid pressure into said pipe-liner component and expand said pipe-liner component into a desired preformed size and shape;*

*Step (3), apply curing means in said oven to at least partially cure a portion of said pipe-liner into a portion of said pipe-liner construction and advance said at least partially cured portion of said pipe-liner construction on-site in a suitable earth's environment from said oven;*

*Step (4), cast-in-place on-site in said suitable earth's environment a selected structural material pipe-wall*

*body around, about, over and under said pipe-liner using said pipe-liner as a forming means on-site in said suitable earth's environment about which said structural material pipe wall body is cast;*

*Step (5), continue processing said preformed polymerizable polymeric-resin-composition-at-least-partially-fabricated - fibrous - reinforcing - material-pipe-liner-component in lengths of increments adapted to the size of said oven and move said at least partially completed increments of said pipe-liner component construction on-site in said suitable earth's environment from said oven;*

*Step (6), continue processing said pipe-liner on-site in said suitable earth's environment and continue casting-in-place additional selected structural material pipe wall body around, about, over and under said additional increments of said pipe-liner component construction;*

*Step (7), set said structural materials that are in an unset state thus making said continuous composite structural material pipe-line construction in said trench.*

References Cited

The following references, cited by the Examiner, are of record in the patented file of this patent or the original patent.

UNITED STATES PATENTS

| | | | |
|---|---|---|---|
| 2,605,202 | 7/1952 | Reynolds | 61—72.2X |
| 2,614,058 | 10/1952 | Francis | 156—171 |
| 2,731,067 | 1/1956 | Miller | 156—432X |
| 2,748,830 | 6/1956 | Nash et al. | 156—171 |
| 2,828,239 | 3/1958 | Fischer | 156—425X |
| 3,068,133 | 12/1962 | Cilker et al. | 156—171 |
| 3,089,213 | 5/1963 | Williamson | 61—72.2X |
| 3,217,077 | 11/1965 | Cocke | 285—288X |
| 1,153,599 | 9/1915 | Carr et al. | 61—72.2 |
| 2,209,726 | 7/1940 | Fleming | 61—72.2 |
| 2,718,684 | 9/1955 | Bjorksten | 61—72.1 |
| 3,132,416 | 5/1964 | Hait | 61—72.6 |
| 3,145,444 | 8/1964 | Brown et al. | 25—32 |
| 3,251,332 | 5/1966 | Vassar | 61—72.3 |

FOREIGN PATENTS

| | | |
|---|---|---|
| 654,982 | 1/1938 | Germany. |

JACOB SHAPIRO, Primary Examiner

U.S. Cl. X.R.

25—32; 156—171, 430, 431